(12) United States Patent
Holland

(10) Patent No.: US 6,887,014 B2
(45) Date of Patent: May 3, 2005

(54) ROBOTIC APPARATUS AND METHOD FOR TREATMENT OF CONDUITS

(76) Inventor: Cal Holland, 216 Huntford Way, N.E., Calgary, Alberta (CA), T2K 3Z7

( * ) Notice: Subject to any disclaimer, the term of this patent is extended or adjusted under 35 U.S.C. 154(b) by 0 days.

(21) Appl. No.: 10/059,205

(22) Filed: Jan. 31, 2002

(65) Prior Publication Data

US 2002/0102136 A1 Aug. 1, 2002

Related U.S. Application Data

(60) Provisional application No. 60/265,109, filed on Jan. 31, 2001.

(30) Foreign Application Priority Data

Jul. 27, 2001 (CA) .............................................. 2354226

(51) Int. Cl.[7] .............................................. F16L 55/18
(52) U.S. Cl. ................................ 405/184.1; 405/184.2; 73/866.5; 104/138.2
(58) Field of Search ........................... 405/184.1, 184.2, 405/184.3, 184.4, 184, 183.5; 138/97, 98; 104/138.1, 138.2; 254/134.3 R, 134.5; 73/866.5

(56) References Cited

U.S. PATENT DOCUMENTS

| | | | |
|---|---|---|---|
| 2,604,521 A | | 7/1952 | Boucher |
| 3,786,684 A | * | 1/1974 | Wiers et al. ................ 73/866.5 |
| 4,006,359 A | * | 2/1977 | Sullins et al. ............. 104/138.2 |
| 4,244,296 A | | 1/1981 | Vertut |
| 4,369,713 A | * | 1/1983 | Richardson ............... 104/138.2 |
| 4,537,136 A | | 8/1985 | Douglas |
| 4,601,204 A | * | 7/1986 | Fournot et al. ........... 104/138.2 |
| 4,628,613 A | * | 12/1986 | Laymon et al. ................ 33/544 |
| 4,654,702 A | | 3/1987 | Tolino et al. |
| 4,862,808 A | | 9/1989 | Hedgcoxe et al. |
| 4,951,758 A | * | 8/1990 | Sonku et al. .................. 175/40 |
| 4,986,314 A | | 1/1991 | Himmler |

(Continued)

FOREIGN PATENT DOCUMENTS

| | | | | |
|---|---|---|---|---|
| DE | 19701787 A1 | | 7/1998 | |
| EP | 785388 | * | 7/1997 | |
| JP | 01255420 | * | 10/1989 | .......... 254/234.3 R |
| JP | 0492189 | * | 3/1992 | ................... 138/97 |

OTHER PUBLICATIONS

Day, L., Robotic Rehabilitation Of Sewer Infrastructure, Robotics for Challenging Environments, 1994.

(Continued)

*Primary Examiner*—Jong-Suk Lee
(74) *Attorney, Agent, or Firm*—Sean W. Goodwin

(57) ABSTRACT

A robotic apparatus and method for treatment of system of conduits and lateral sub-conduits comprising a remotely controlled robotic vehicle which navigates main conduits which delivers a series of tools to locations within the conduit. The mule's tools comprise a variety of devices including a tape head and a transport housing for a second remotely controlled robotic vehicle, or mouse which can be deployed for traversing and treating sub-conduits. Further, a method to install one or more small diameter flexible elongate members, such as conductors or sheathes to the inside of the system of conduits comprises advancing an elongate member through the conduit system with the mule or mouse, anchoring the elongate member and then taping the elongate member with the taping head while retreating out of the conduit. Preferably the tape is pre-shaped to minimize wrinkling upon application and more preferably, greater security and tape bonding strength is achieved by spraying over the tape and elongate member.

66 Claims, 40 Drawing Sheets

U.S. PATENT DOCUMENTS

| | | | |
|---|---|---|---|
| 5,044,824 A * | 9/1991 | Long et al. | 405/156 |
| 5,172,639 A | 12/1992 | Wiesman et al. | |
| 5,284,096 A * | 2/1994 | Pelrine et al. | 104/138.2 |
| 5,293,823 A | 3/1994 | Box | |
| 5,356,502 A | 10/1994 | Kamiyama et al. | |
| 5,392,715 A * | 2/1995 | Pelrine | 104/138.2 |
| 5,497,707 A | 3/1996 | Box | |
| 5,498,389 A | 3/1996 | Kamiyama et al. | |
| 5,515,886 A | 5/1996 | Granella | |
| 5,598,873 A | 2/1997 | Kamiyama et al. | |
| 5,601,025 A | 2/1997 | Box | |
| 5,791,255 A | 8/1998 | Box | |
| 5,878,783 A | 3/1999 | Smart | |
| 5,944,058 A | 8/1999 | Kamiyama et al. | |
| 6,019,048 A | 2/2000 | Seeberger et al. | |
| 6,056,017 A | 5/2000 | Kamiyama et al. | |
| 6,101,951 A | 8/2000 | Sigel | |
| 6,104,772 A | 8/2000 | Dippel et al. | |
| 6,107,795 A | 8/2000 | Smart | |
| 6,123,027 A | 9/2000 | Suyama et al. | |
| 6,142,187 A * | 11/2000 | Goldenberg et al. | 138/97 |
| 6,173,787 B1 * | 1/2001 | Wittrisch | 166/384 |
| 6,179,058 B1 * | 1/2001 | Wittrisch | 166/384 |
| 6,206,617 B1 * | 3/2001 | Kawazoe et al. | 408/57 |
| 6,301,414 B1 | 10/2001 | Liese et al. | |
| 6,332,930 B1 * | 12/2001 | Rose | 15/104.5 |
| 6,427,602 B1 * | 8/2002 | Hovis et al. | 104/138.1 |

OTHER PUBLICATIONS

Inuktun Services Ltd., Versatrax 150 Product Description, 3 pages, undated.

Inuktun Services Ltd., Versatrax Vertical Crawler Product Description, 2 pages, undated.

GMD German National Research Center for Information Technology, MAKRO–13 Design and realization of an autonomous multi–segment sewer robot platform, 1 page., undated.

AiS, Kurt—An experimental robot platform for sewerage inspection, web page, http://ais.gmd.de/BAR/kurt.htm , Dec. 20, 2001.

* cited by examiner

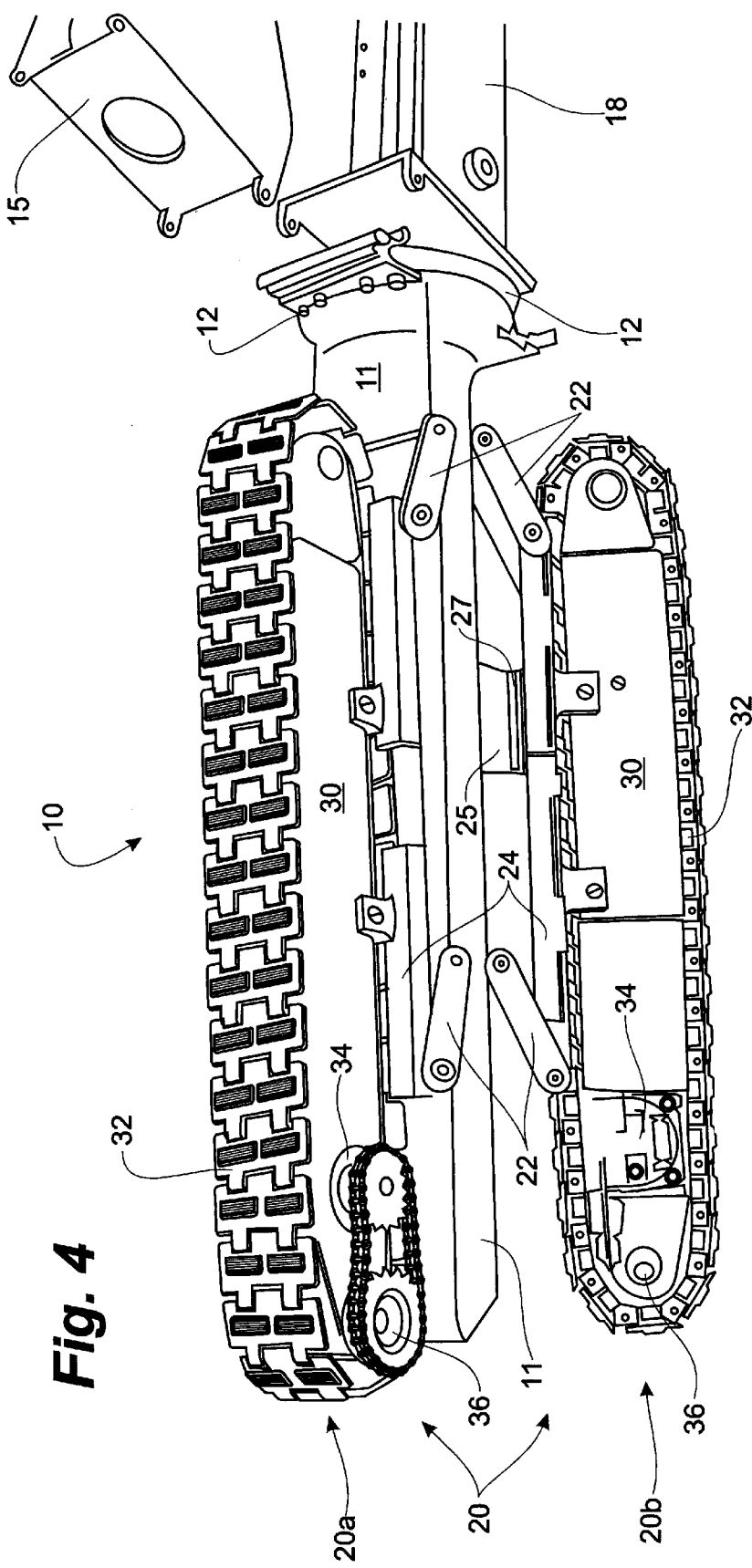

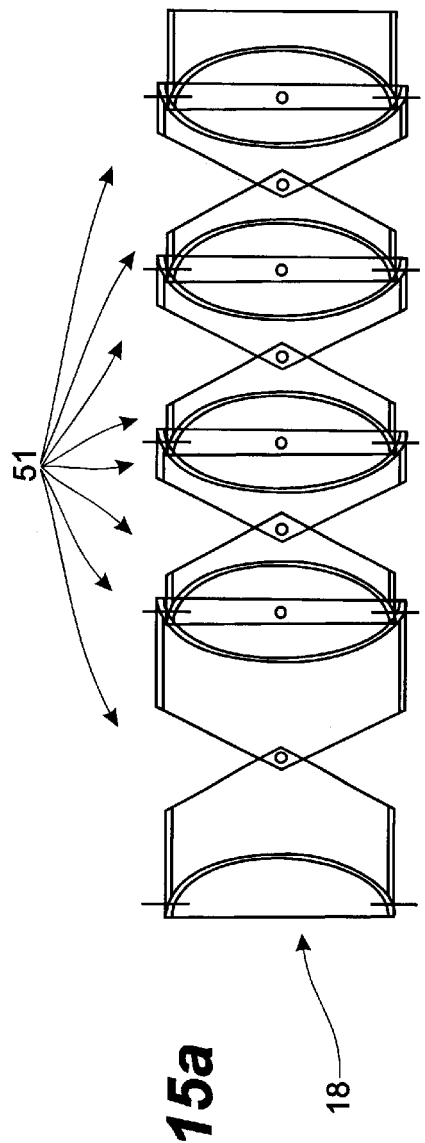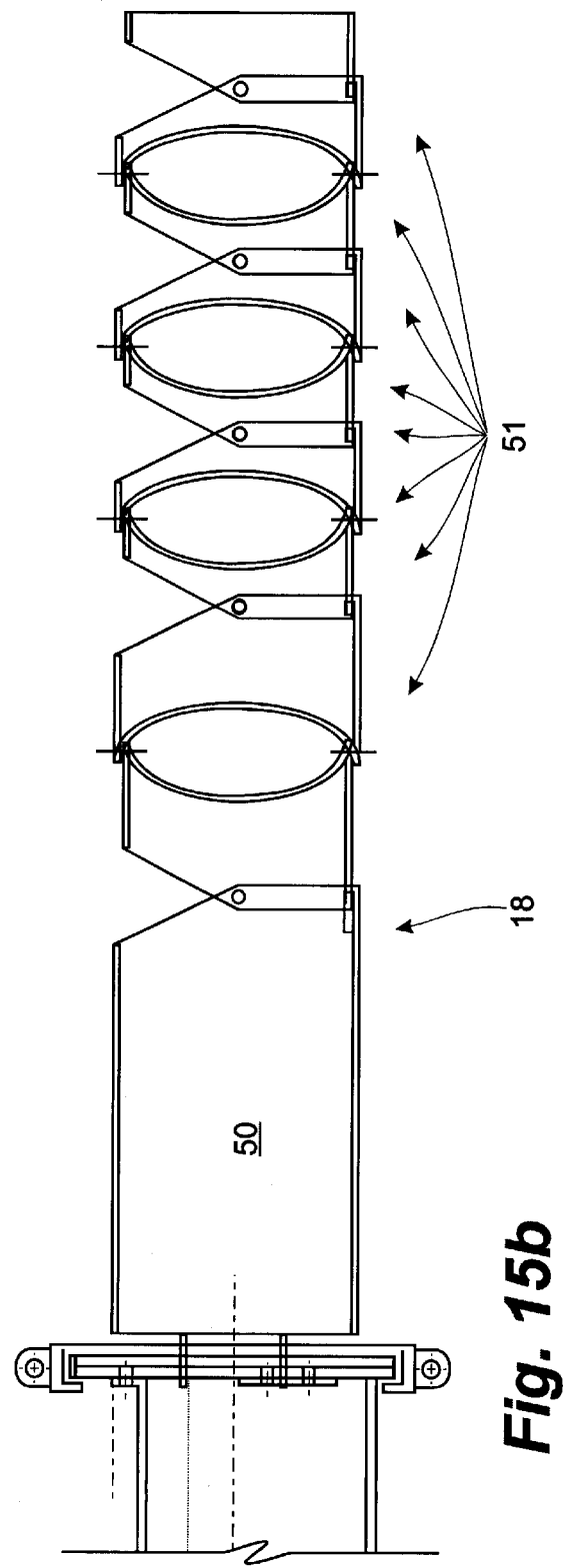
Fig. 15a
Fig. 15b

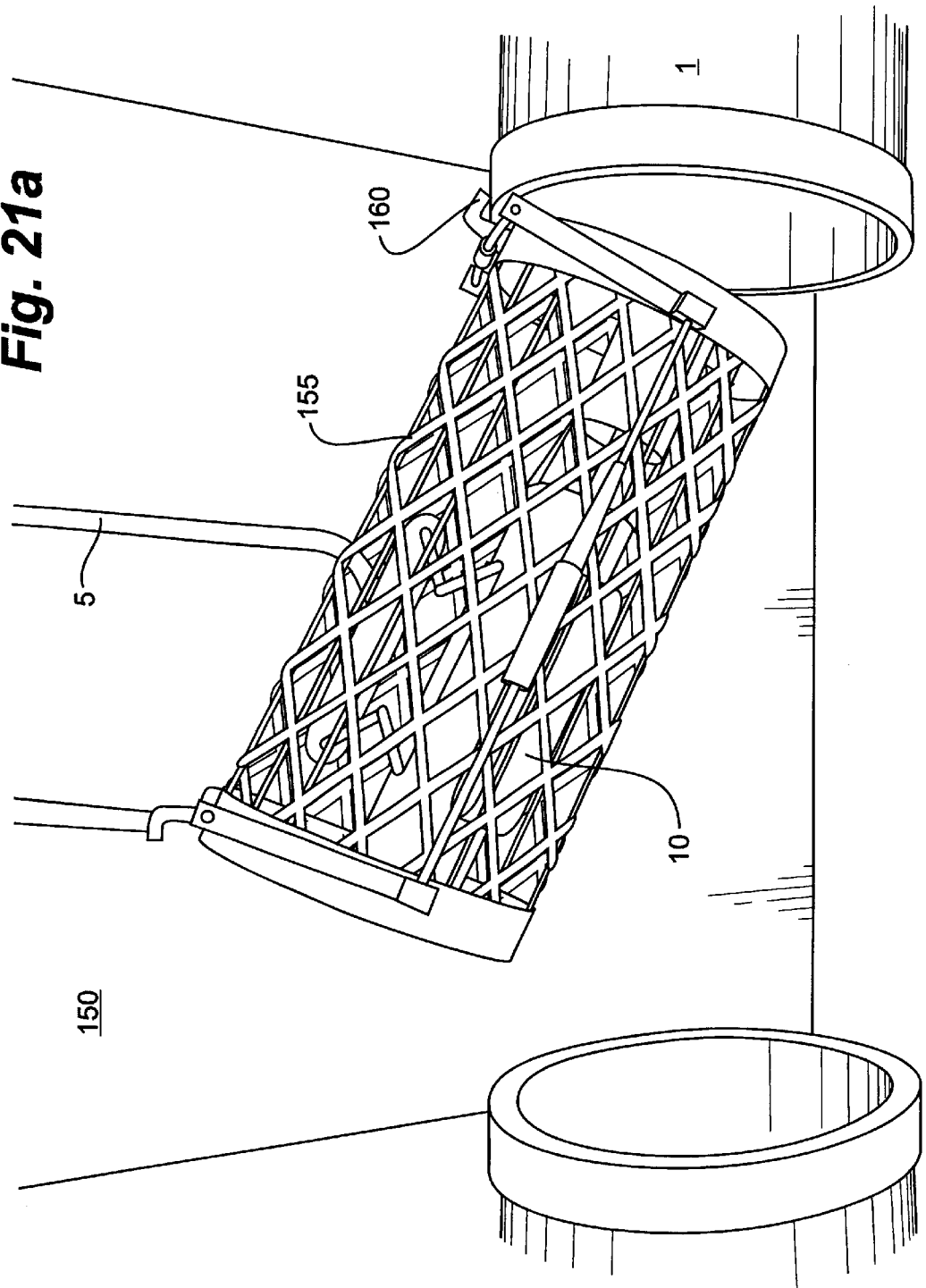

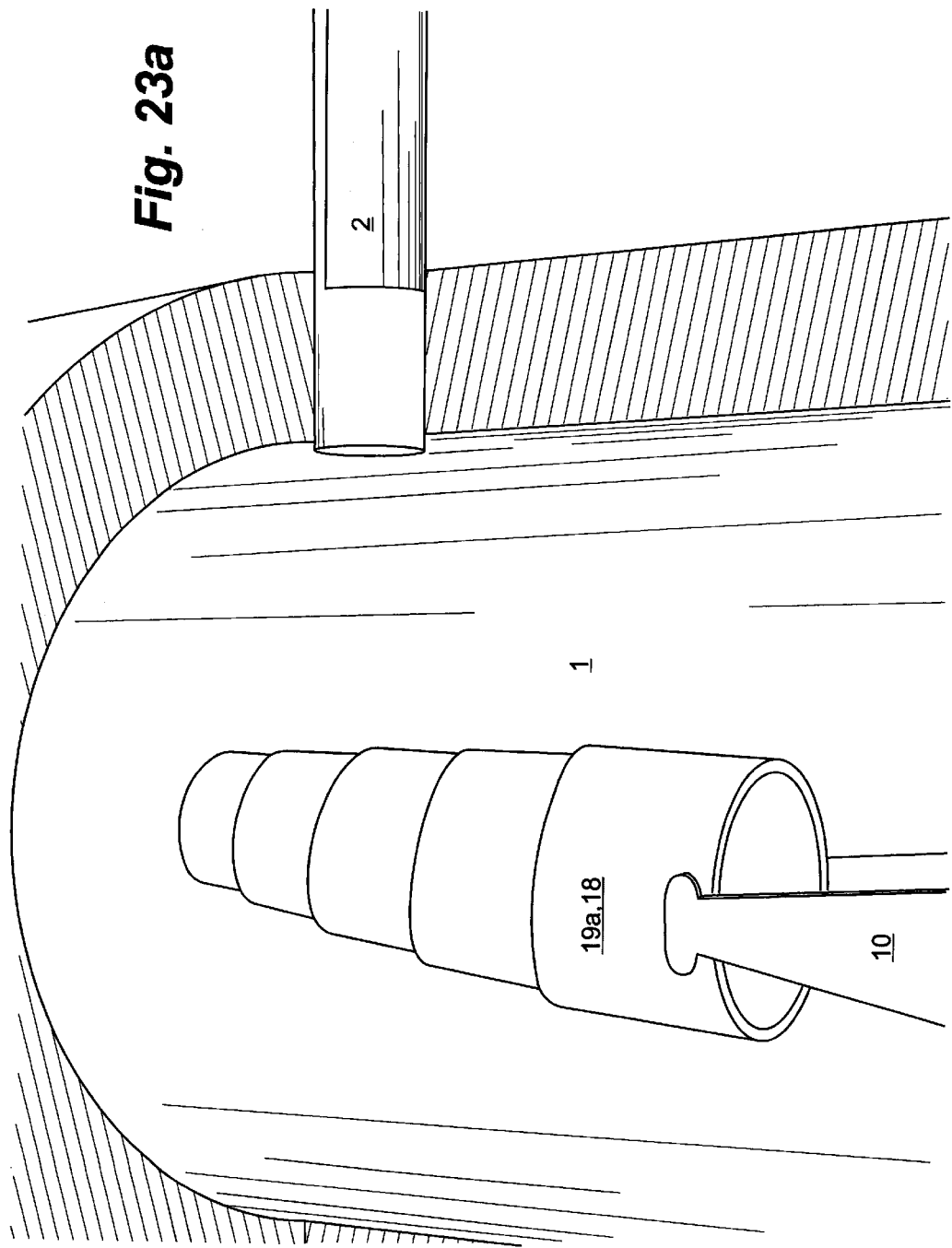

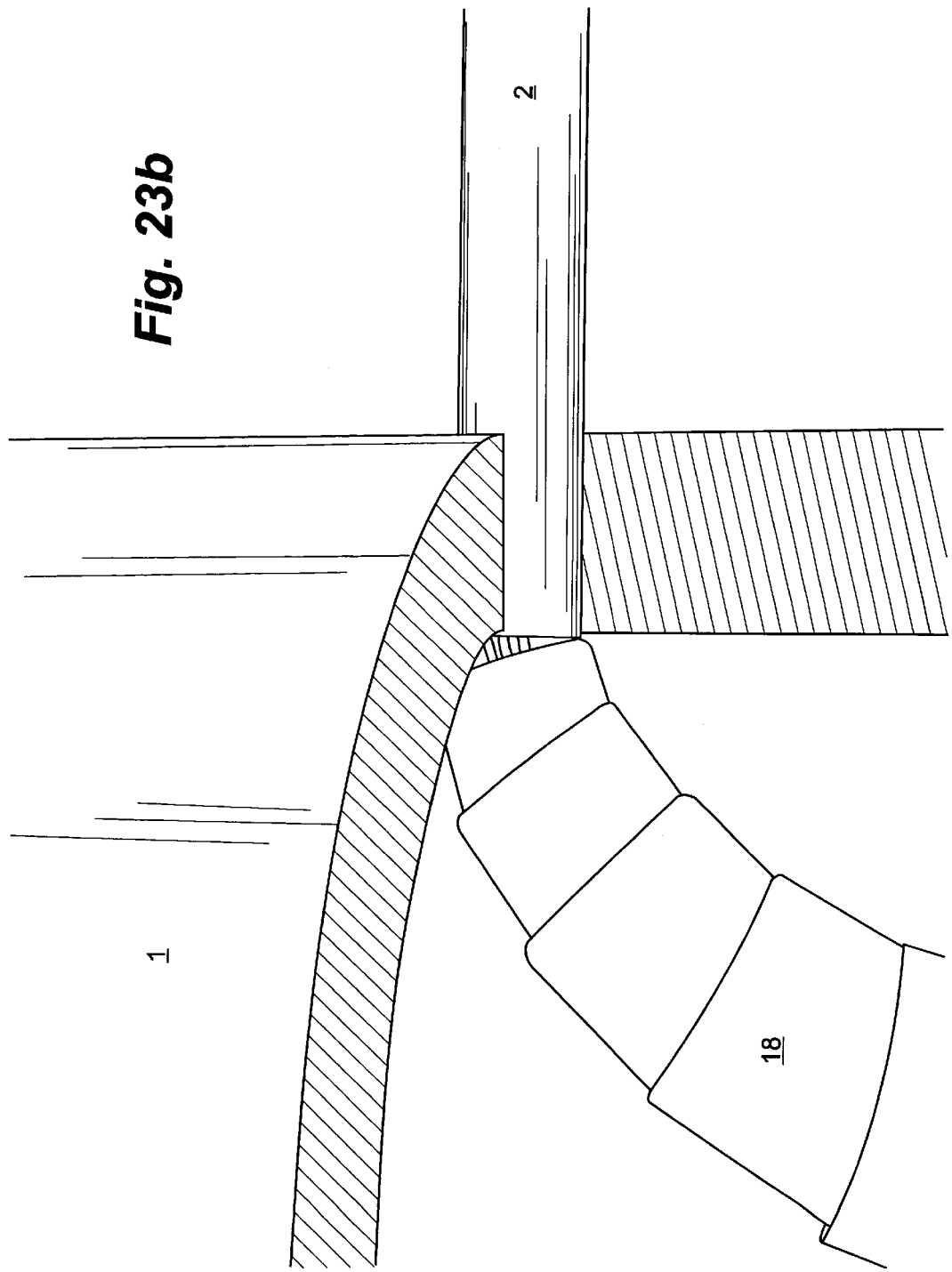

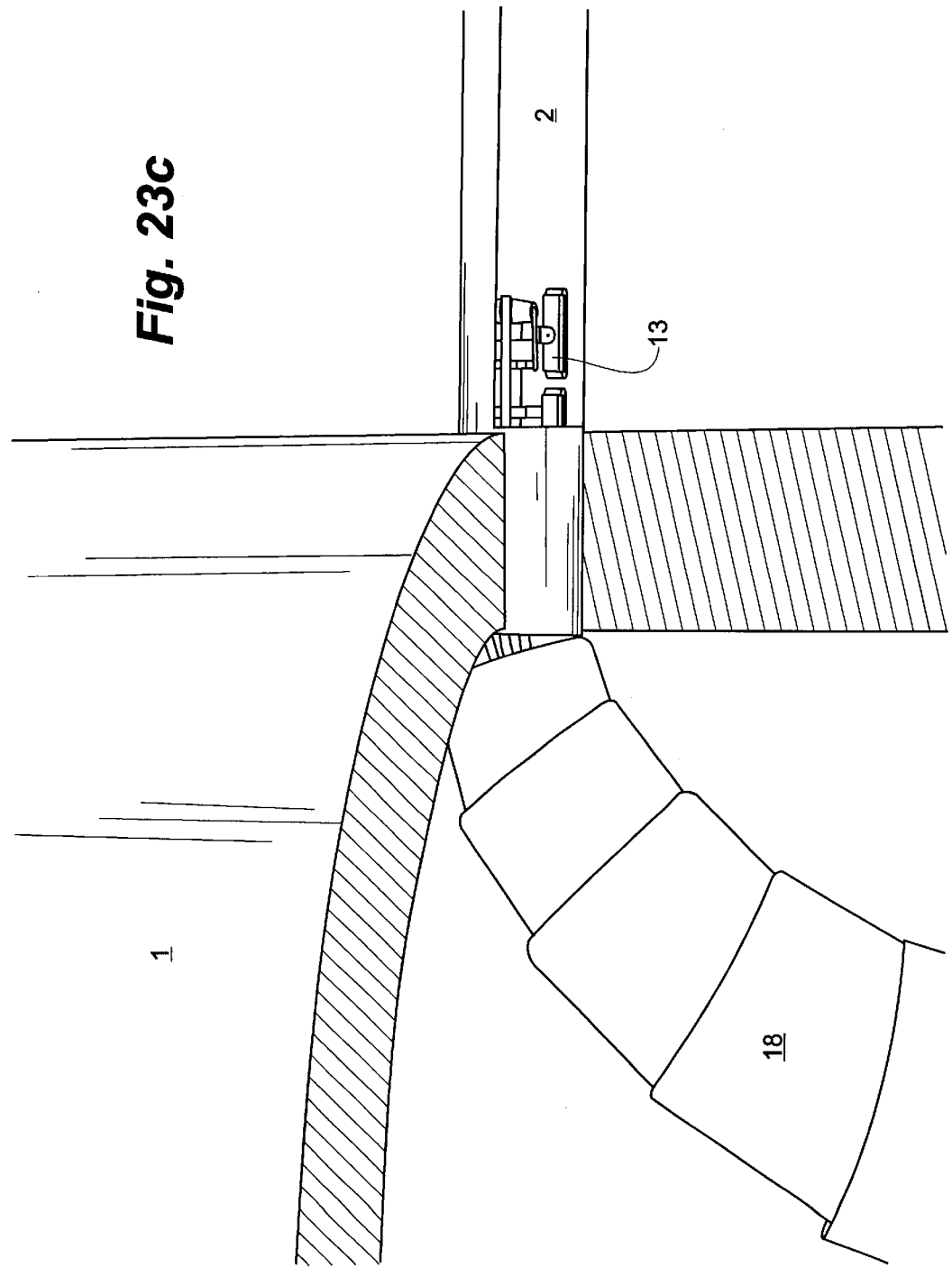

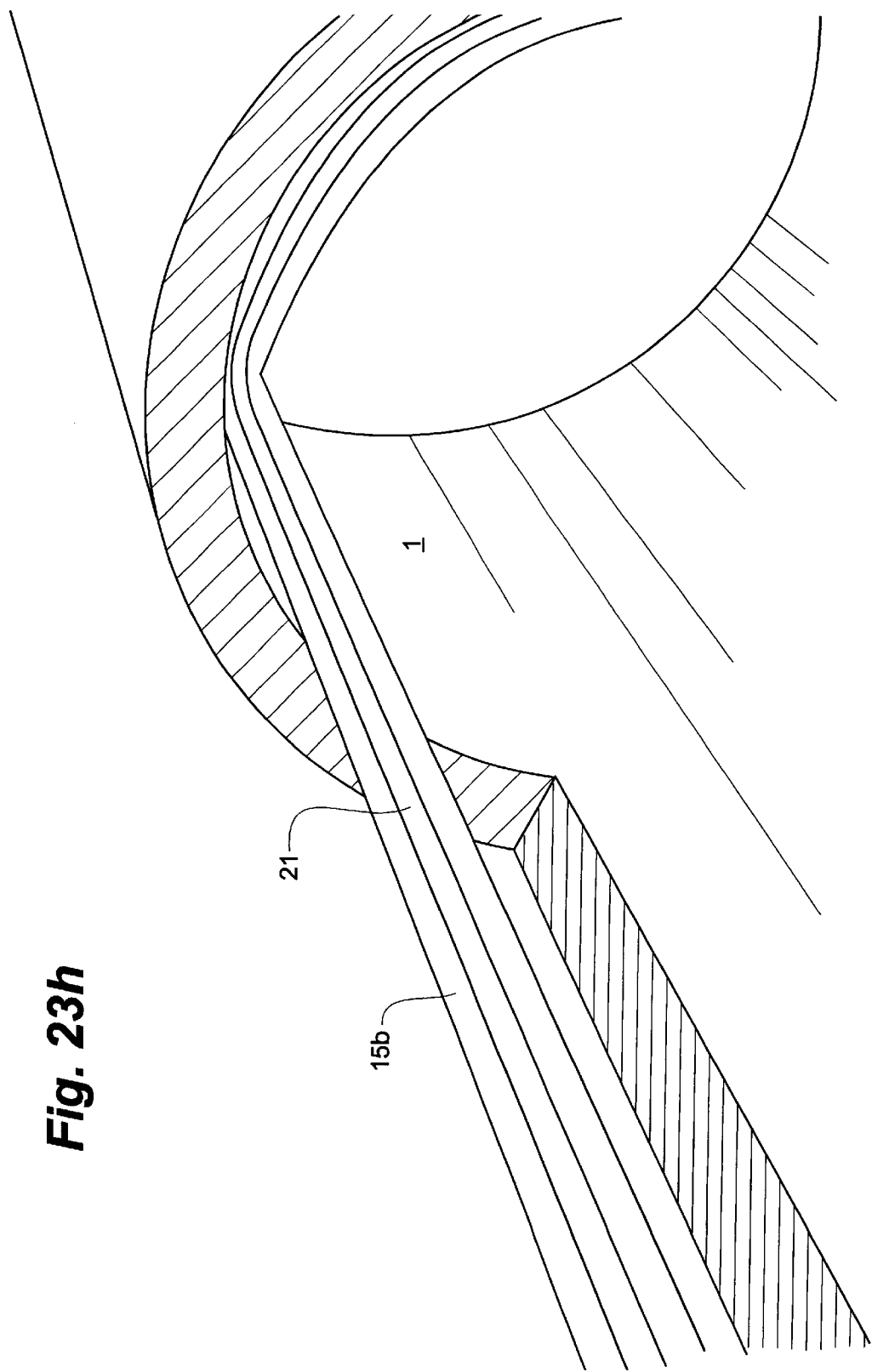

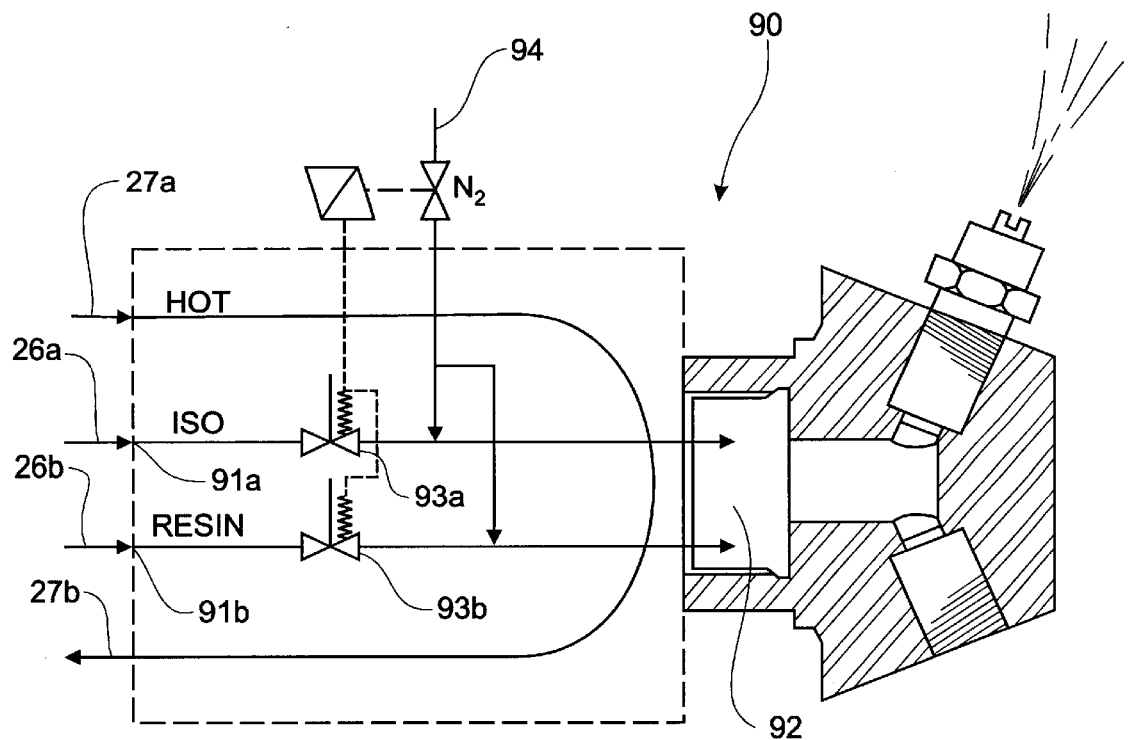
Fig. 25a
Fig. 25b
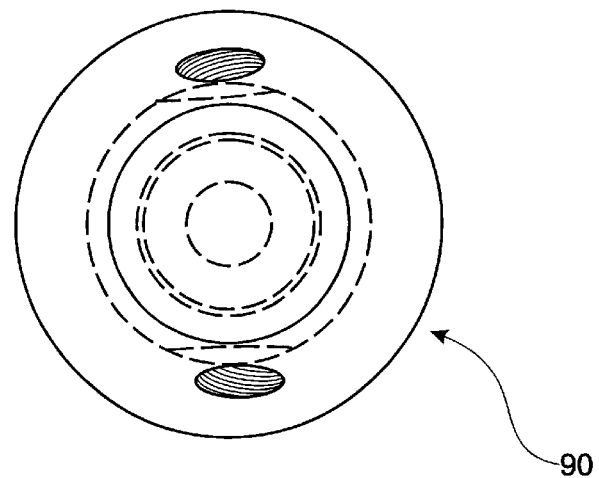

ROBOTIC APPARATUS AND METHOD FOR TREATMENT OF CONDUITS

This application claims the benefits of Provisional Application 60/265,109 filed Jan. 31, 2001.

FIELD OF THE INVENTION

The present invention relates to a robotic system for inspecting, rehabilitating, expanding and upgrading conduits of various sizes including in-situ polyurethane/urea application and epoxy spray-liner application for pipeline rehabilitation. In another aspect the invention relates to a process and apparatus for accessing lateral sub-conduits. In yet another aspect the invention relates to a process for attaching a cable or sheath to the inside wall of a conduit.

BACKGROUND OF THE INVENTION

The deteriorating underground infrastructure of water, sewer, gas and other pipelines is creating an ever increasing demand for quick and efficient treatment methods and devices. There are generally two approaches to treat this infrastructure; open trench and trenchless repair. Since many of the existing underground infrastructure is located in congested or urban areas, conventional open trench methods cause significant disruption of service.

There are a variety of known trenchless technologies. Slip lining involves inserting a new pipe (typically HDPE) into an existing pipe. The annular space is grouted. The annular space between the host pipe and the liner can be used to carry sewage from laterals until they have been reinstated to the slip liner. Segments are commonly heat fused which provides for a joint-less pipe. Although this method is technically trenchless, excavations are needed at the insertion pit this method is technically trenchless, excavations are needed at the insertion pit and at each lateral location. A further disadvantage of this method is that with the insertion of a liner, there can be significant loss of hydraulic capacity.

Cured-in-place pipe consists of a flexible fabric tube impregnated with a thermosetting resin. The tube is inserted into an existing pipe and injected steam or hot water cures the resin and shapes the tube into the form of the existing pipe. No excavation is needed as the tube can be inserted through an existing manhole and laterals are reinstated robotically. However, the cost of this method is expensive (equal or greater than pipe replacement, and greater than slip lining).

Fold-and-form pipe consists of a preformed polyethylene or polyvinyl chloride pipe formed into a U-shape, that after insertion is expanded by steam or hot water, to fit snuggly against the host pipe. This method is typically used for pipes with a diameter greater than 48". There is no excavation necessary as the liner can be inserted through an existing manhole, and laterals are reinstated robotically. This method is less costly than the cured-in-place pipe method.

Deform/reform pipe involves the construction of a pro-filed wall pipe fabricated at the bottom of a manhole, access shaft or man-entry. A PVC strip is pulled through a winding machine which incorporates a series of rollers that form a circular pipe. The pipe is literally wound into the host pipe.

Epoxy spray coating may be used to extend the life of an existing pipe by increasing its strength and protecting it from corrosion or abrasion. Coatings are difficult to apply if infiltration is present, and most coatings cannot be successfully applied to active water leaks or areas where ponding occurs.

Pipe bursting involves working pits and excavations adjacent to manholes. A pipe is fused on site to make a seamless section. The pipe is then fastened to a bursting tool that breaks the existing pipe and compacts the soil. The new pipeline can be of the same or larger diameter. New watertight fittings are installed at every lateral connection. However, lateral connections have to be excavated so there is more surface disruption than with the cured-in-place or fold-and-form methods.

Trenchless technologies, where underground conduits are installed, repaired and modified using robotic methods address the need of efficient rehabilitation without disruption of services caused by excavations. As such, there exist a number of robotic vehicles to conduct trenchless repairs. For example, U.S. Pat. Nos. 5,878,783 and 6,107,795 to Smart discloses a pipeline vehicle for carrying out operations in a gas pipeline such as drilling and welding of a service pipe which branches off from a main pipe. Another robotic device, for use in sewer pipes and capable of grinding off uneven portions or mending cracks, is disclosed in U.S. Pat. No. 6,101,951 to Sigel. A third example of a robotic pipeline vehicle is the one disclosed in U.S. Pat. No. 4,986,314 to Himmler which is capable of carrying a milling tool and other rotating tools such as wire brushes and polishing or metal cutting wheels.

One disadvantage of the robotic devices identified above is that they are incapable of controlled, small radius turns to move into lateral subconduits which usually intersect a main pipeline or conduit at a sharp angle. The modular train vehicle described by Smart, although able to negotiate bends in the pipe, is unable to actually enter into the lateral branch lines, or pipe take-offs. The robotic vehicles disclosed by Siegel and Himmler face a similar limitation, i.e. they are restricted to navigating the main conduits only.

Other robotic vehicles are capable of small radius turns into intersecting conduits. For example, U.S. Pat. No. 497,707 to Box discloses robotic vehicle for travel through a conduit or pipe which is able to execute turns and navigate extreme bends. However, this vehicle is slow due to its inchworm-like movement resulting from the repeated inflation and deflation of the bladders and the repeated extension and contractions of the bellow members. Furthermore, to travel through conduits of varying sizes Box's vehicle has to be disassembled and then reassembled into a different sized vehicle; effectively preventing it from navigating into intersecting conduits of smaller diameter.

In addition to the robotic devices, other apparatus and methods have also been developed to assist in the treatment of conduits. For example, U.S. Pat. No. 6,301,414 to Liese et al. discloses a communications cable network for use in a duct or tube system wherein the communications cables are mounted on the walls of the duct or pipe system inside a rigid sheath and attached by numerous fastening elements. By installing communications cables inside underground conduits, such as sewers, the cables can be installed in a simple efficient manner all the way to individual buildings without costly earthwork.

However, using individual fasteners to attach a cable or sheath to the inside of a conduit is associated with a number of disadvantages. Generally the fasteners are hooks or loops which are screwed into the conduit wall. The fastening itself, or corrosion at the interface, can eventually damage the pipe, hooks or loops and are slow to install.

In published German Patent application DE 19701787A1 to Hecht, one method of installing fibre-optic cable is disclosed which includes directing a robotic vehicle to periodically place semi-circular cable supporting clips which expand to engage the inside of a conduit. Another alternate method is to introduce a hose along the conduit and inflate it to sandwich a cable therebetween, the hose being induced to harden once deployed—this is believed to be similar to the cured-in-place process described above. No apparatus is specifically disclosed which is capable of placing the clips or for introducing a hose and cable to a conduit. Further, there is no suggested solution for adapting to laterally intersecting and extending conduits. The prior art may still be associated with disadvantages in both speed and economy.

Ideally, a device designed to navigate underground pipelines and conduits would also be able to extend into smaller diameter intersecting branch lines or conduits, adjust to different diameter size pipes and still navigate quickly for production of high throughput and economy.

SUMMARY OF THE INVENTION

In its preferred form, the present invention enables treatment of conduits and intersecting sub-conduits alike. Beyond spray coating rehabilitation and such other treatments, the apparatus and methods of the present invention enable installation of a network of cabling or cable sheathing.

In one apparatus aspect, apparatus is provided for treating a system of conduits having at least one main conduit and having one or more intersecting sub-conduits comprising: a robotic mouse suitable for traversing the one or more sub-conduits; a device carried by the mouse for treating the one or more conduits; a robotic mule suitable for traversing the main conduit and for transporting said mouse.

In another aspect, apparatus is provided for installing a flexible elongate member to an inside wall of a conduit, comprising: a robotic vehicle for traversing the conduit for advancing an end of the flexible member through the conduit; and a tape head mounted to the robotic vehicle for taping the flexible member to the inside wall while withdrawing the robotic vehicle.

The described apparatus enables implementation of novel methods for the treatment system of conduits having at least one main conduit and having one or more intersecting sub-conduits comprising: providing a robotic mouse vehicle suitable for traversing the one or more sub-conduits and conducting treatment; providing a robotic mule vehicle suitable for traversing the main conduit; transporting the mouse to a sub-conduit using the mule; deploying the mouse into the sub-conduit; treating the conduits and sub-conduits using the mouse and mule.

In another aspect a method is provided for installing a flexible member to an inside wall of a conduit, comprising the steps of: providing a robotic vehicle for traversing the conduit; advancing an end of the flexible member through the conduit using the robotic vehicle being fitted with a tape head; anchoring the advanced end of the flexible member; and taping the flexible member to the inside wall using the tape head while withdrawing the robotic vehicle.

BRIEF DESCRIPTION OF THE DRAWINGS

FIG. 4 is a perspective detailed view of a tri-track mule according to one embodiment of the invention;

FIGS. 15a and 15b are top and side views respectively of an articulated arm according to one embodiment of the invention;

FIGS. 21a–21g illustrate a selected sequence of operations for spray coating rehabilitation treatment of a system of conduits, more particularly: introduction of the mule and a mouse, spray coating or cleaning, coating, coating on a curve, aligning with a sub-conduit, deployment of the mouse with a plug, actuation of a plug; spray coating a subconduit;

FIGS. 23a–23h illustrate a selected sequence of operations for taping flexible members in a system of conduits using an articulated arm and a plurality of mouse robots according to FIG. 19, namely: the mule arriving at a subconduit, actuating the arm to align the mouse with the sub-conduit, running the flexible members with the mouse robots, negotiation of a curve, capture and initiation of taping of the member to the conduit; and taping of the flexible member to the conduit as the plurality of mouse robots retreats from the sub-conduit;

FIGS. 25a and 25b are cross-sectional and front views of a conventional nitrogen purging spray nozzle, FIG. 25a having a schematic representation of the plural component, nitrogen purge and optional heated fluid circulation connections.

DETAILED DESCRIPTION OF THE PREFERRED EMBODIMENTS

Figure 1:
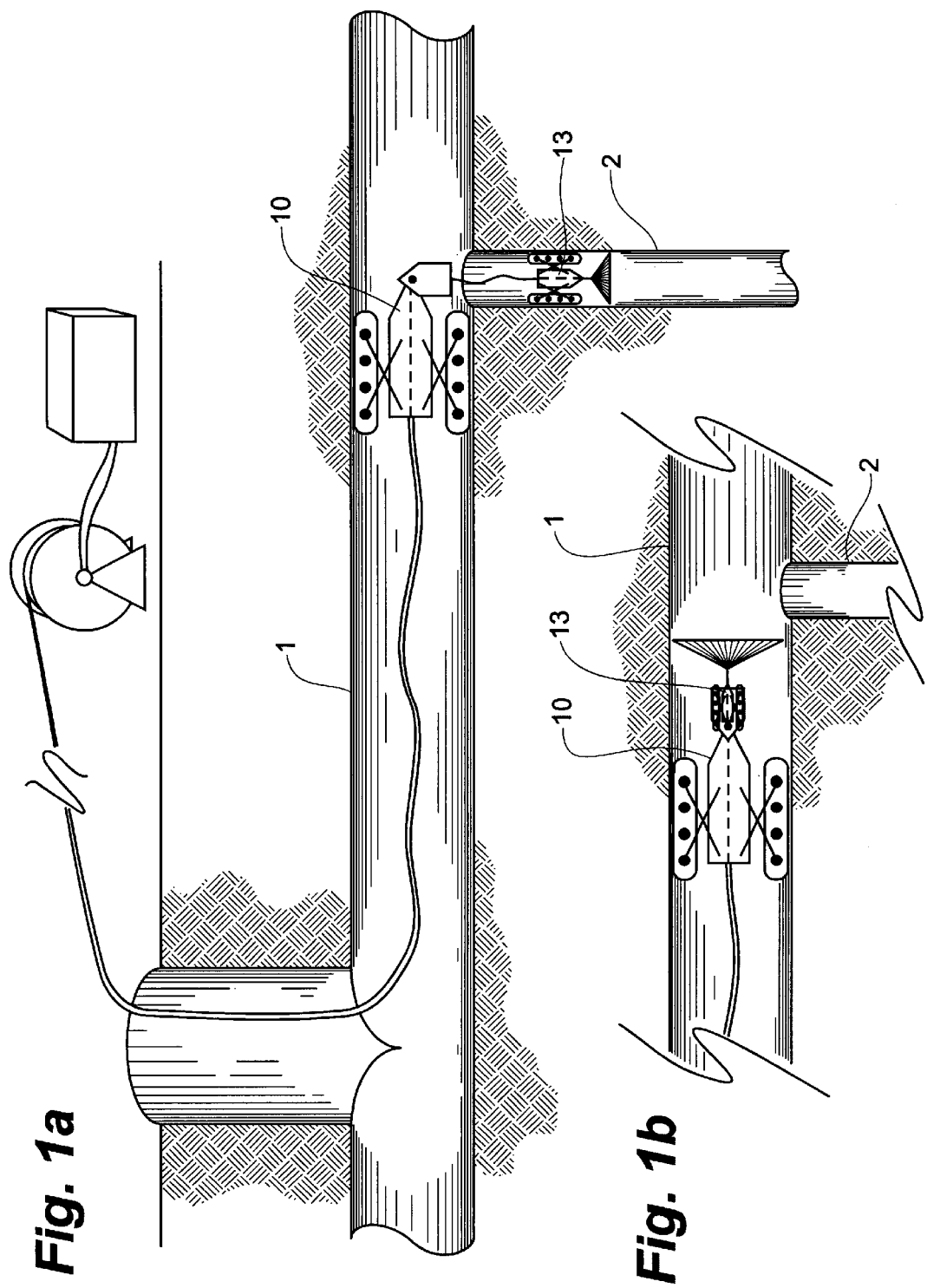
FIGS. 1a and 1b are schematic side views of a system of conduits (FIG. 1a) and lateral intersecting sub-conduits (FIG. 1b) being spray coating treated using one embodiment of the invention.
Figure 2:
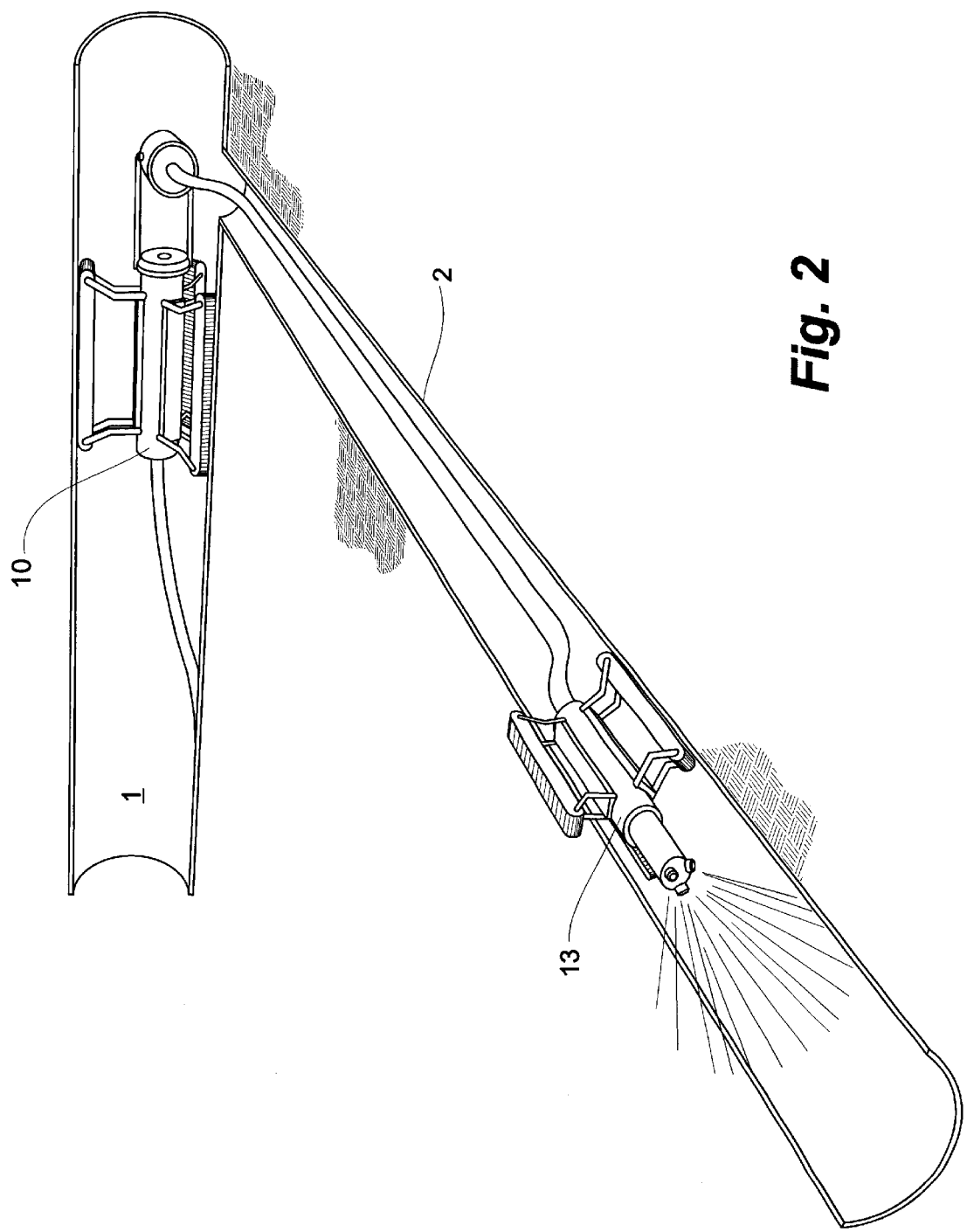
FIG. 2 is a perspective view of the mouse engaged in treating a lateral sub-conduit while the mule waits in the main conduit.
Figure 3:
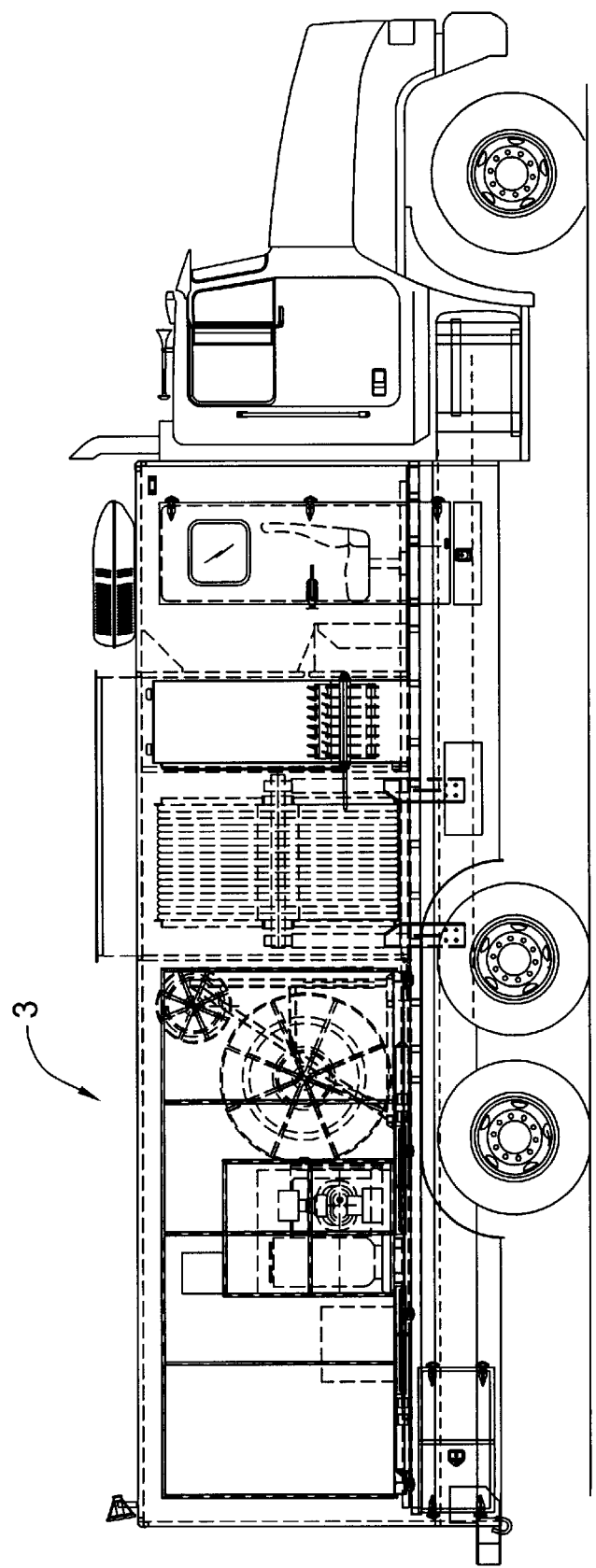
FIG. 3 illustrates a cross sectional view of a control vehicle suitable for deploying the mule and mouse in the system of conduits and sub-conduits.

Having reference to FIGS. 1–3, in a first embodiment, a system of conduits comprising one or more main conduits 1 and one or more sub-conduits 2, is navigated by a robotic vehicle or a mule 10. The mule 10 is capable of negotiating the conduits for delivering and deploying a series of devices or tools, such as polyurethane coating spray nozzles, to remote locations in the conduit or sub-conduits. The mule 10 is remote controlled from surface and is provided with data and control communications, a power source and consumables as required. Another robotic vehicle or mouse 13 is optionally provided which is particularly useful in traversing and treating sub-conduits. As shown in FIG. 3, at surface, a control vehicle 3 is typically provided for delivering the mule 10, the mouse 13 and the associated controls to the site of the conduits 1 and sub-conduits 2. The control vehicle 3 comprises: power sources such as electrical, hydraulics, and pneumatics; remote computer controls, reel storage for umbilicals for delivery and support of various systems.

Turning to FIG. 4 in greater detail, the mule 10 has a centralized main body 11 and a rotatable head assembly 12. The mule 10 is propelled by a drive 20 comprising three track assemblies 20a, 20b, 20c, each of which comprises an oval track housing 30, a loop of track 32 fitted around the perimeter of said housing 30, a drive motor 34 and gear mechanism 36. The drive motor 34 drives the gear mechanism 36, which in turn drives the track 32. Suitable drive motors 34 include those powered through electrical, pneumatic or by hydraulic means.

Each of the track assemblies 20a, 20b, 20c are attached to the main body 11 via expandable linkage assemblies 22. The linkage 22 acts to substantially center the body 11 within a predetermined range of conduit diameters. The illustrated parallelogram linkages 22 connect to the track assemblies via a standoff or connector 24 comprising a rectangular plate having sides extending radially outwardly about the track loop 32 and attaching to the track housing 30. The linkages 22 are expanded and retracted radially using a centering means including a screw jack, air cylinders or as illustrated, air diaphragms 25.

To aid in centering the mule's body 11, air diaphragms 25 are fixed to the body 11 and are sandwiched between the body 11 and each track connector 24. A push-plate 27 engages the connector 24 for manipulating each track assembly's radial position.

Applying increasing compressed air, the diaphragms 25 are expanded, thereby pushing the push-plate 27 against the connector 24 and pivoting the track assembly 20a, 20b, 20c outward and forward relative to the main body 11. Reduction in the air pressure in the diaphragms 25 results in a pivoting of the track assembly 20a, 20b, 20c inward and backward relative to the main body 11 due to the force of gravity. The amount of pressure in each individual diaphragm 25 can be individually controlled, but are more preferably interconnected using a closed pneumatic circuit so as to controlled the diaphragms as one unit, ensuring that each of the track assemblies 20a, 20b, 20c is spaced substantially the same distance from the main body 11 and thereby centering the main body 11 in a conduit. The range of the centering means determines the range of diameters of conduit which can be serviced by the same mule 10.

To assist in navigating the mule 10 through a conduit 1,2 a number of small conventional video cameras can be mounted to the mule 10. A digital CCD camera with a built in light source is the preferable type of video camera, but other types and other light sources can be used.

An advantageous arrangement of cameras comprises three forward-facing cameras on the front of the mule 10 and two backward-facing cameras on the back. The forward-facing cameras are preferably placed either on each track assembly 20a, 20b, 20c or equal distance from each other around the front of the main body's 11 outside perimeter so that they are approximately 120° from each other. The backward-facing cameras are preferably placed at either side of the main body 11 so that they are approximately 180° from each other.

Figures 5A, 5B:
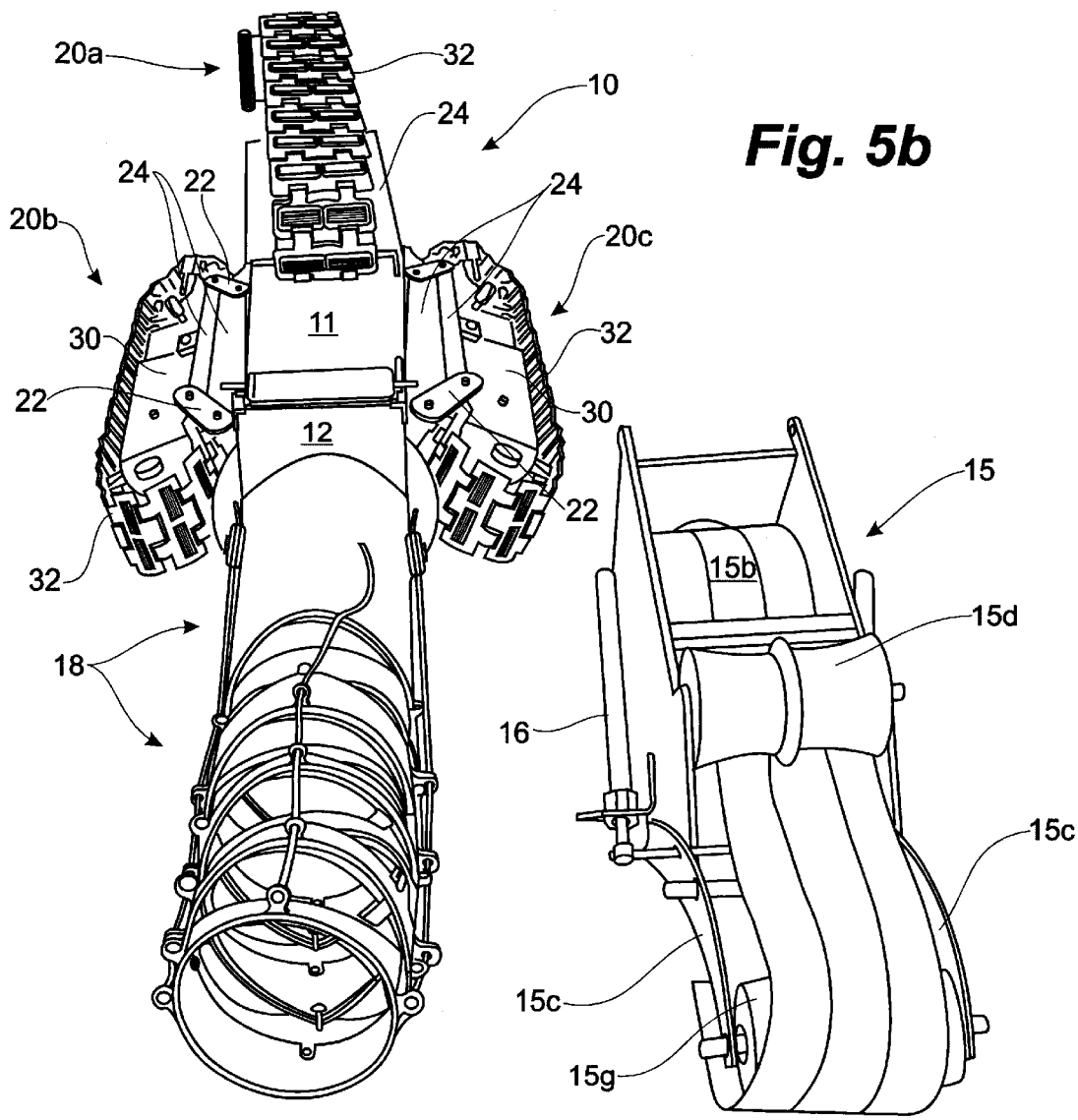
FIG. 5 is a perspective view of the mule according to FIG. 4 with a tape head and articulating arm.
Figure 6:
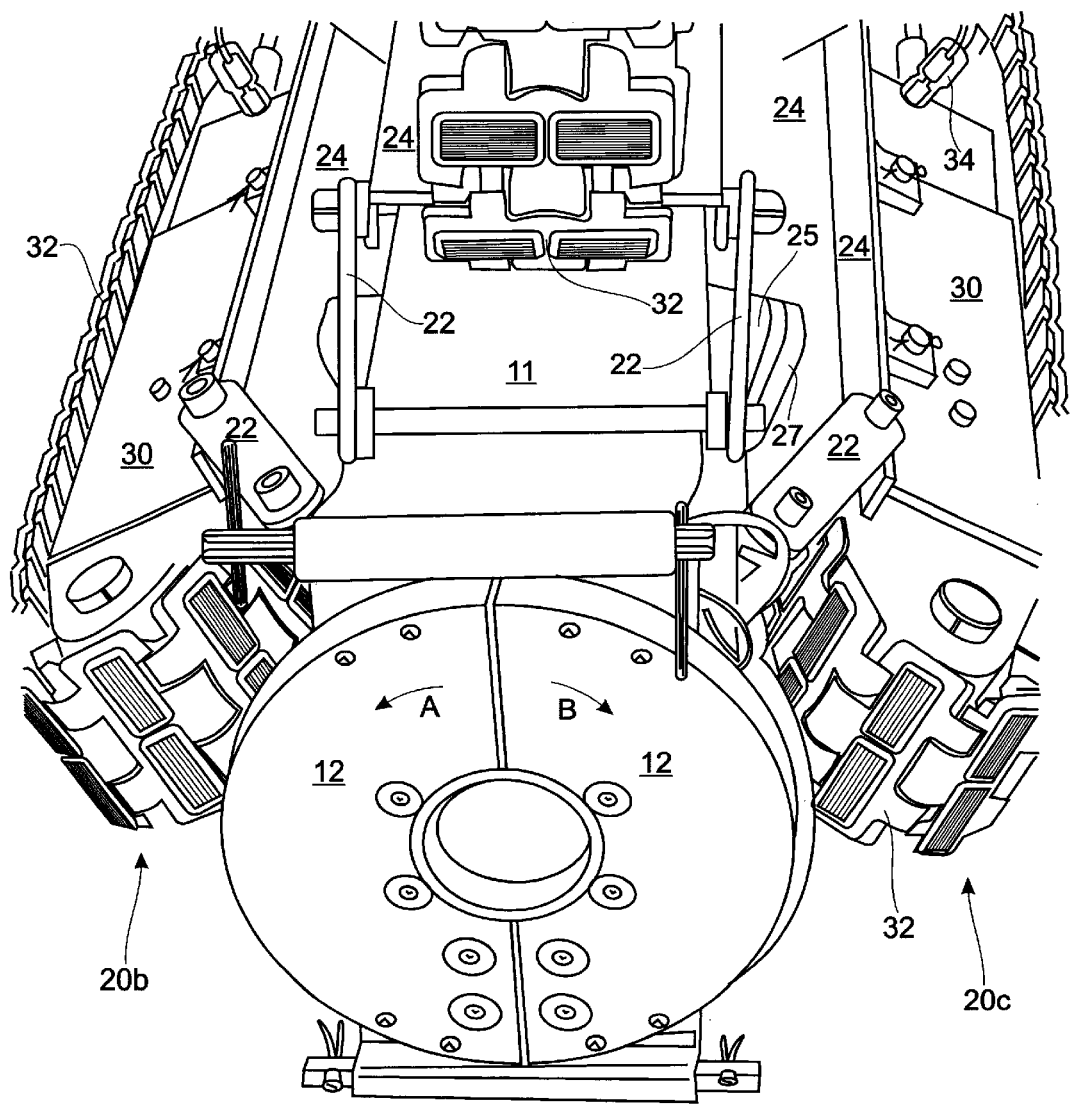
FIG. 6 is a perspective detailed view of the head assembly of the mule of FIG. 4 adaptable for devices such as a tape head and articulating arm according to FIG. 5.

As shown in FIGS. 5 and 6, the head assembly 12 supports a variety of devices, including a tape head 15 or an articulated deployment arm 18. The rotating aspect of the head assembly 12 assists in the positioning of an attached device when the mule 10 is inside the conduit. The head can be optionally restricted to 270degrees; being 135° clockwise A and 135° counterclockwise B and thereby can avoid over-rotating the articulated arm 18. The rotation of the head, and control of its position, is accomplished by means of a motorized gear assembly (not shown).

While the mule 10 can be fitted with its own power source and remote communications, the mule's range can be increased while reducing its size and weight by supplying all via an umbilical.

Figure 7:
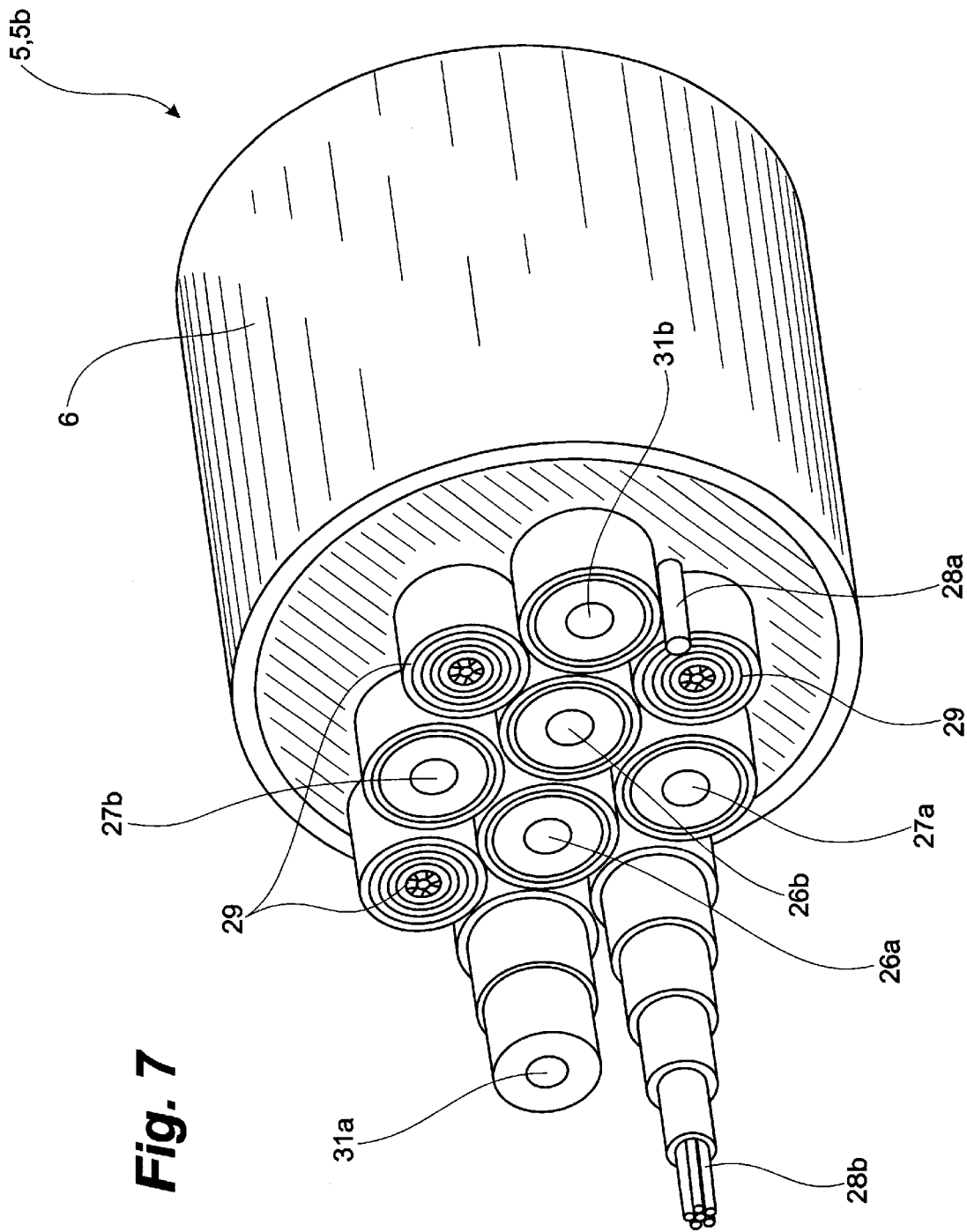
FIG. 7 is a partial perspective, cutaway view of the portion of an umbilical according to one embodiment of the invention.

Having reference to FIG. 7 an umbilical or umbilicals 5, suitable for remote robotic controls and delivery of plural component polyurethane coating, comprises a plurality of specialized conduits embedded within a protective cover 6. A typical 1 13/16" diameter umbilical capable of manufacture in lengths of up to 2750 ft long is be capable of a plural component delivery flow rate of about 0.5 gallons/min at a working pressure of 3000 lbs, and having a bursting pressure of 5000 lbs. The umbilical comprises plural component conduits including an isocyanate conduit 26a and a resin conduit 26b. The isocyanate and resin are kept warm using a heat source such as electrical heat trace elements (not shown) extending through at least a portion of the length of the umbilical or using hot heat transfer fluid circulation (a feed line 27a and return line 27b). If used, heat tracing can comprise 18 gauge wire carrying 480 volt and 2.5 amps, (1200 watts). Such a heating element would typically be present in only the first 400 feet or so of umbilical. At high enough plural component flow rates, the remainder of the umbilical would not need to be additionally heated as the plural components should retain sufficient heat. A temperature control line 28a would report on umbilical temperature or termination temperature. Data control cables 28b, such as 6 wire, 20 gauge conductors can be encased in insulation, triad sheath, a neoprene jacket, armor and a poly outer coating. Up to three electrical cables 29 provide power for a variety of devices at the mule 10 or mouse 13. Particularly useful with plural component sprays is the need for purging the spray nozzle when the flow of isocyanate and resin terminate. Accordingly, it is also useful also to provide a pressurized nitrogen supply in a liner-wrapped hose 31a. Pneumatics can be powered using a pressurized air supply hose 31b.

All of the various conduits are wrapped in an insulation layer and housed in a durable outer coating 6.

Preferably any heat transfer fluid can be used, but for maximum versatility hydraulic fluid which is food grade (such as canola oil) is used to allow for conduit treatment in potable water systems. The working temperature of the umbilical ranges from 130° F. to 160° F. The umbilical 5 is coated 6 both inside and outside with Teflon to decrease the drag coefficient. Any joints are tapered and molded creating a one piece umbilical 5.

Referring to FIGS. 25a, 25b, other devices that can be used with the mule and mouse arrangement include a spray nozzle 90, most preferably a nitrogen ($N_2$) purging spray head. Generally the $N_2$ purging spray nozzles 90 are designed to spray plural component polyurethane (Pur). A typical configuration for a purging spray nozzle has inlets 91a, 91b for each of the ioscyanate and resin components which are offset so that they mix in a static mixer tube 92, and not at their respective valves 93a, 93b. A nitrogen purge 94 blows the tube 92 clean before the Pur can set. The valves 93a, 93b always remain charged with single component materials and thus will not set up. The mixing tube 92 is designed so that there are no cavities and thus, during purging, the components are forced away from the inlet valves. Nitrogen purging occurs automatically each time the valves 93a, 93b are closed.

Various nozzle head designs include single, dual (shown) and quad nozzles and applying the spray at prescribed fan angles (e.g. single nozzle at 45°, dual nozzle at 22.5° and quad nozzle each at 11.25°). The nozzle heads are designed such that there are no cavities in which the polyurethane components can mix and set. A typical flow rate of the components is about 0.5 gallons/min for each head. The working pressure of the nozzles is 3000 lbs. The temperature at the heads will vary, depending on the design, and ranges from 135° F. to 160° F.

Figure 8:
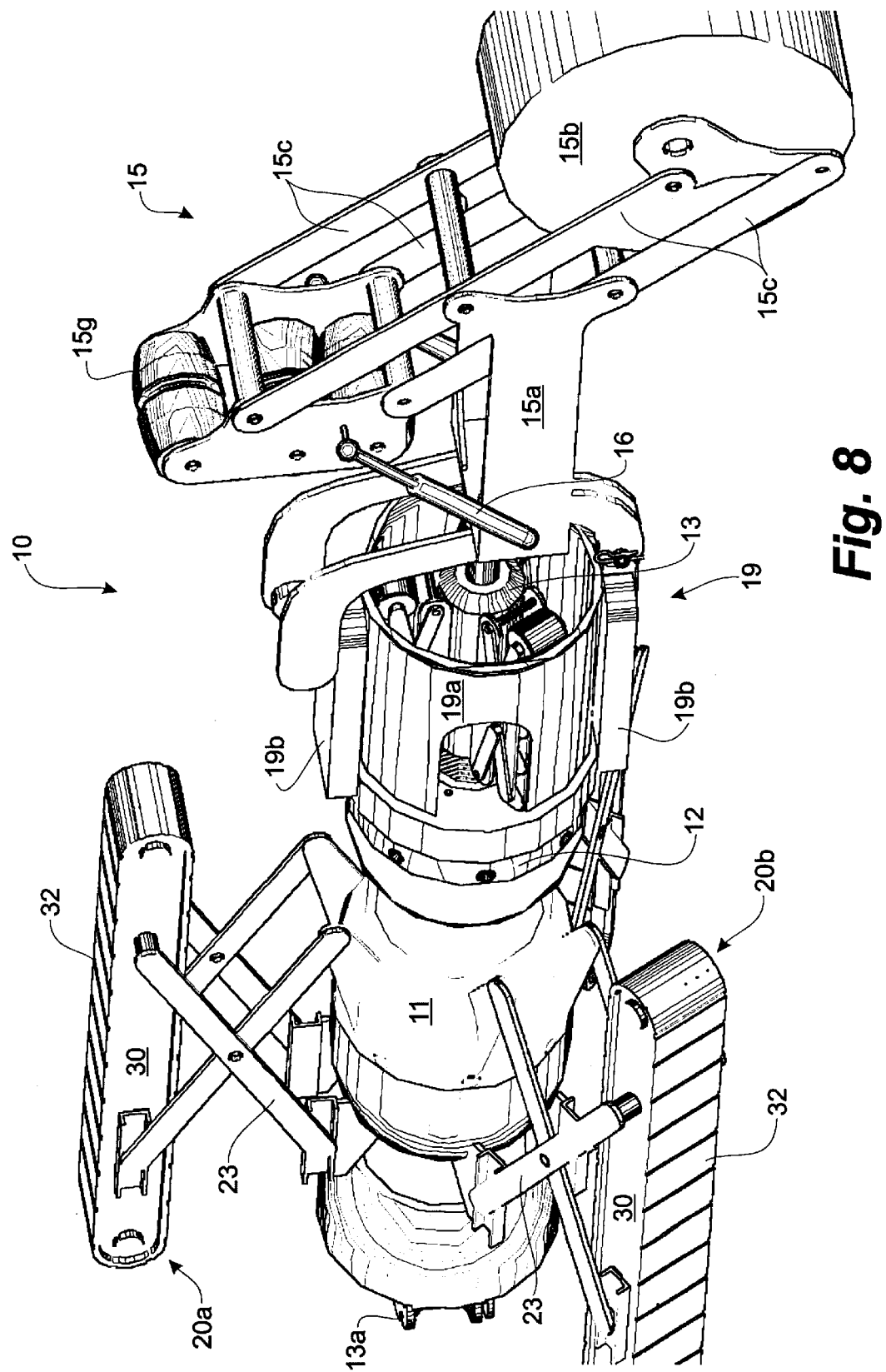
FIG. 8 is a perspective view of another embodiment of a tri-track mule with an articulating housing having a mouse supported therein for transport and further having a tape head attached to the mule.
Figure 9:
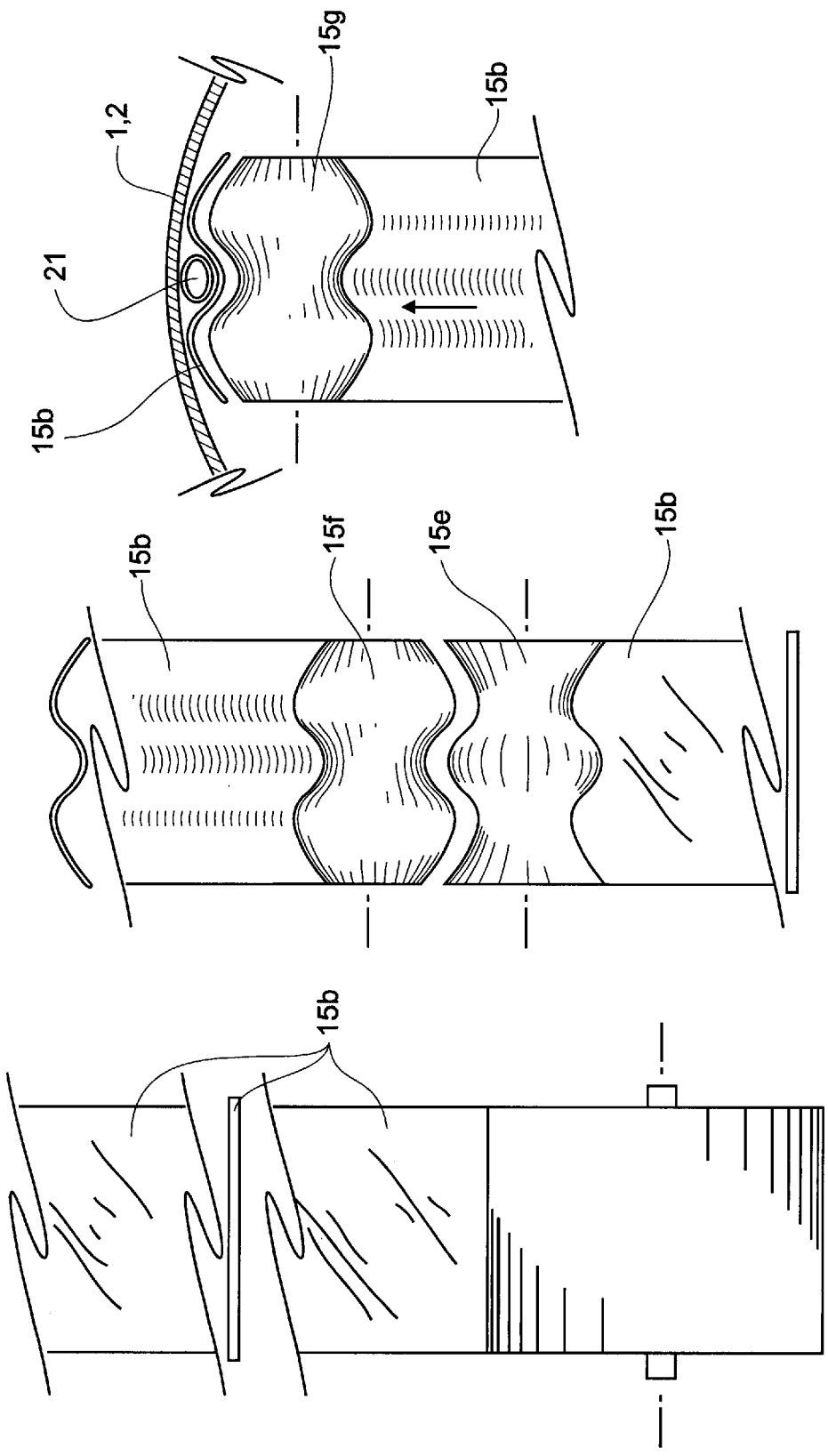
FIG. 9 illustrates three stages of pre-shaping normally flat profile tape for application to the conduit; dispensing from the roll, pre-froming the tape, and guiding the pre-formed tape to the conduit.
Figure 10:
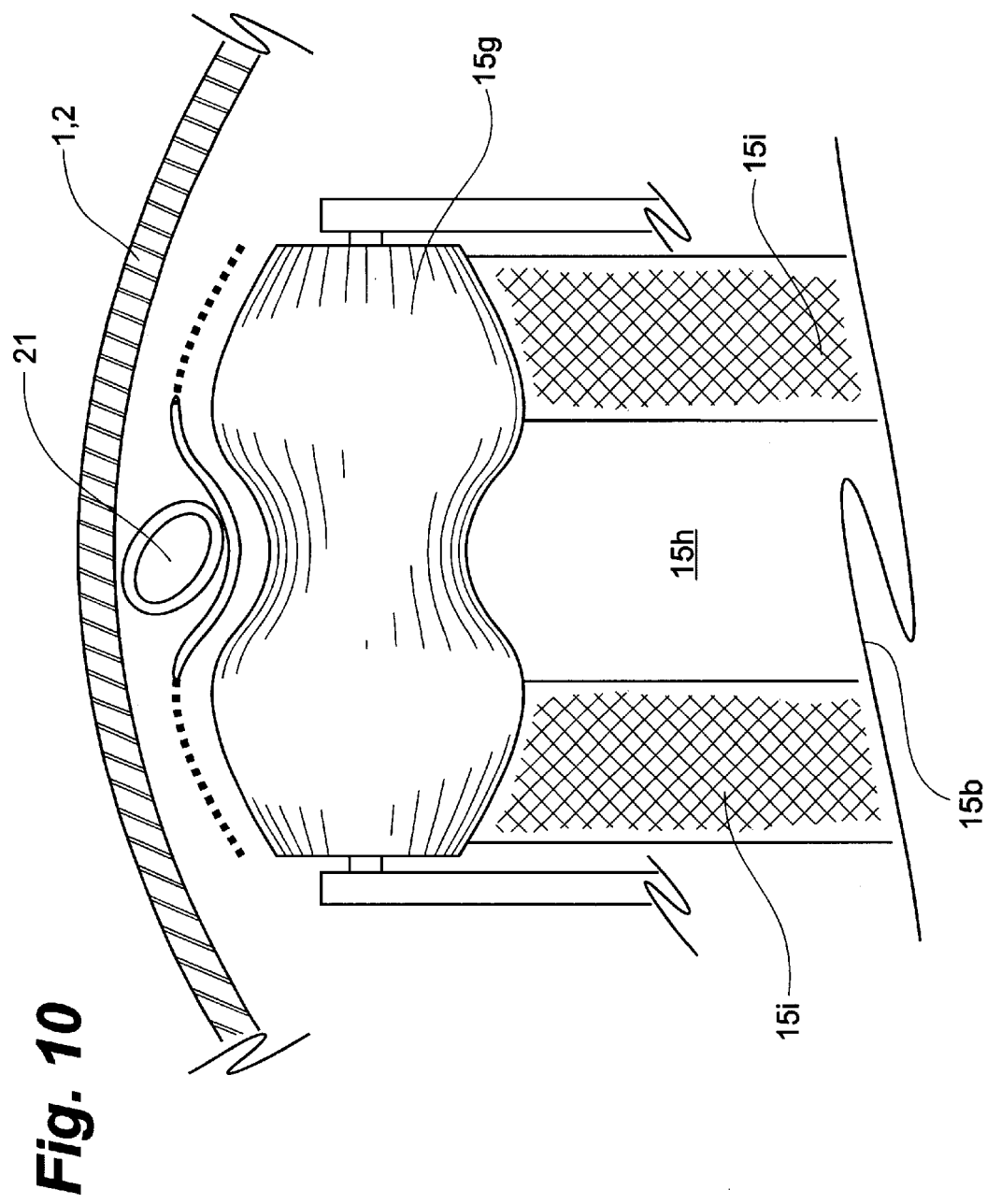
FIG. 10 illustrates the operation of a guide roller pressing tape and an elongate member into position against the conduit.

Having reference to FIGS. 5 and 8 a tape device, dispenser or head 15 can be adapted for mounting directly to the mule 10 (FIG. 5) or as an extension from additional devices. The tape head 15 comprises a roll supply of tape 15b having at least one working face bearing adhesive, a pivoting linkage 15c, guiding rollers 15d, and two pneumatic air-rams 16. Typically, the tape head 15 is used to tape small gauge conduit, cable or other flexible elongate members 21, to the inside of the main conduit 1 or sub-conduit 2. As the mule 10 retreats from a conduit 1,2, the rollers 15d simultaneously guide the tape and sandwich the flexible member 21 between the tape 15b and the conduit 1,2. As shown in FIGS. 8 and 9, the roll of adhesive tape 15b feeds as a normally flat profile through a pair of pre-shaping rollers 15e, 15f for concave dimpling 15h of the middle portion of the tape 15b. The concave dimpling 15h forms as concave receiver or support portion for the flexible member 21. Pre-shaping the tape 15b minimizes wrinkling when ultimately applied to the inside of the conduit 1,2. Referring also to FIG. 10, a final guide and placing roller 15g presses the tape 15b and flexible member 21 into position against the conduit 1,2. The air rams 16 ensure sufficient adhesive bonding pressure is applied to the tape 15b.

Figure 11:
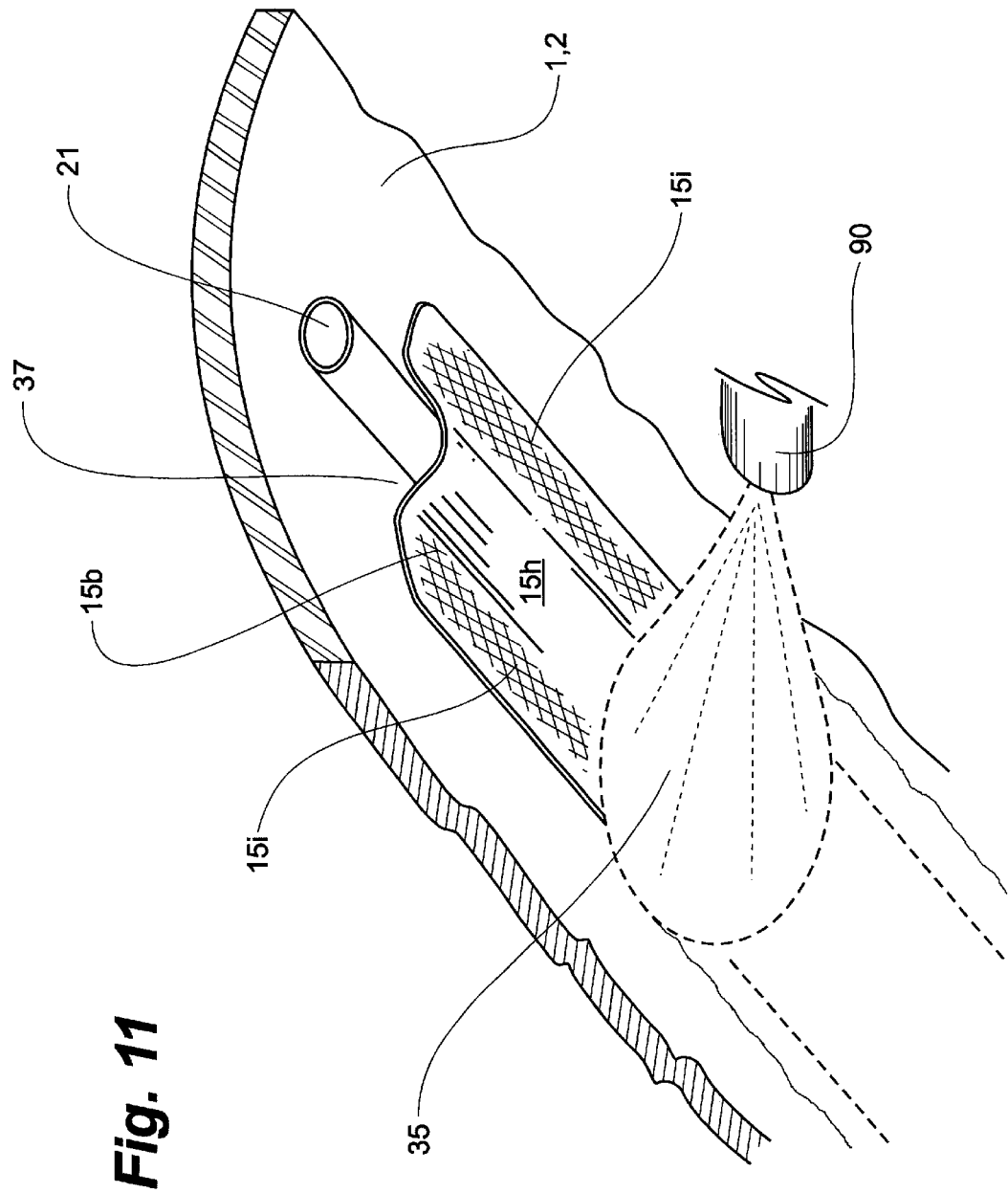
FIG. 11 illustrates the an optional application of a coating over an elongate member, tape having porous lateral edges and of a least a portion of inside wall of a conduit.

Referring to FIG. 11, in a preferred embodiment, additional security and tape bonding strength is achieved using a post polyurethane spray step. As the flexible member 21 is taped to the conduit 1,2, plural component coating (polyurethane) 35 can also be sprayed over the elongate member 21, the tape 15b and the inside wall of the conduit 1,2. Additional advantage is obtained if at least the bounding peripheral lateral edges 15i, 15i of the tape 15c are perforated or otherwise porous so as to enable penetration of the polyurethane 35 through the peripheral edges of the tape 15b and to better enable direct bonding of the polyurethane and the tape to the conduit 1,2, thereby only relying for a short duration upon the adhesive of the tape. Further, by producing tape having porous lateral edges and also having an adhesive-free and spray impervious middle portion, the flexible member is then merely supported in a tape pocket 37 but is not otherwise constrained. The tape pocket enables the flexible member 21 to move somewhat along the conduit 1,2 such as is the case with longitudinal expansion and contraction of the member 21 which differs from that of the conduit 1,2. In this way, members 21 such as sensitive communications cables and the like are not subject to tensile loads which could threaten the integrity of the cable.

Figure 12:
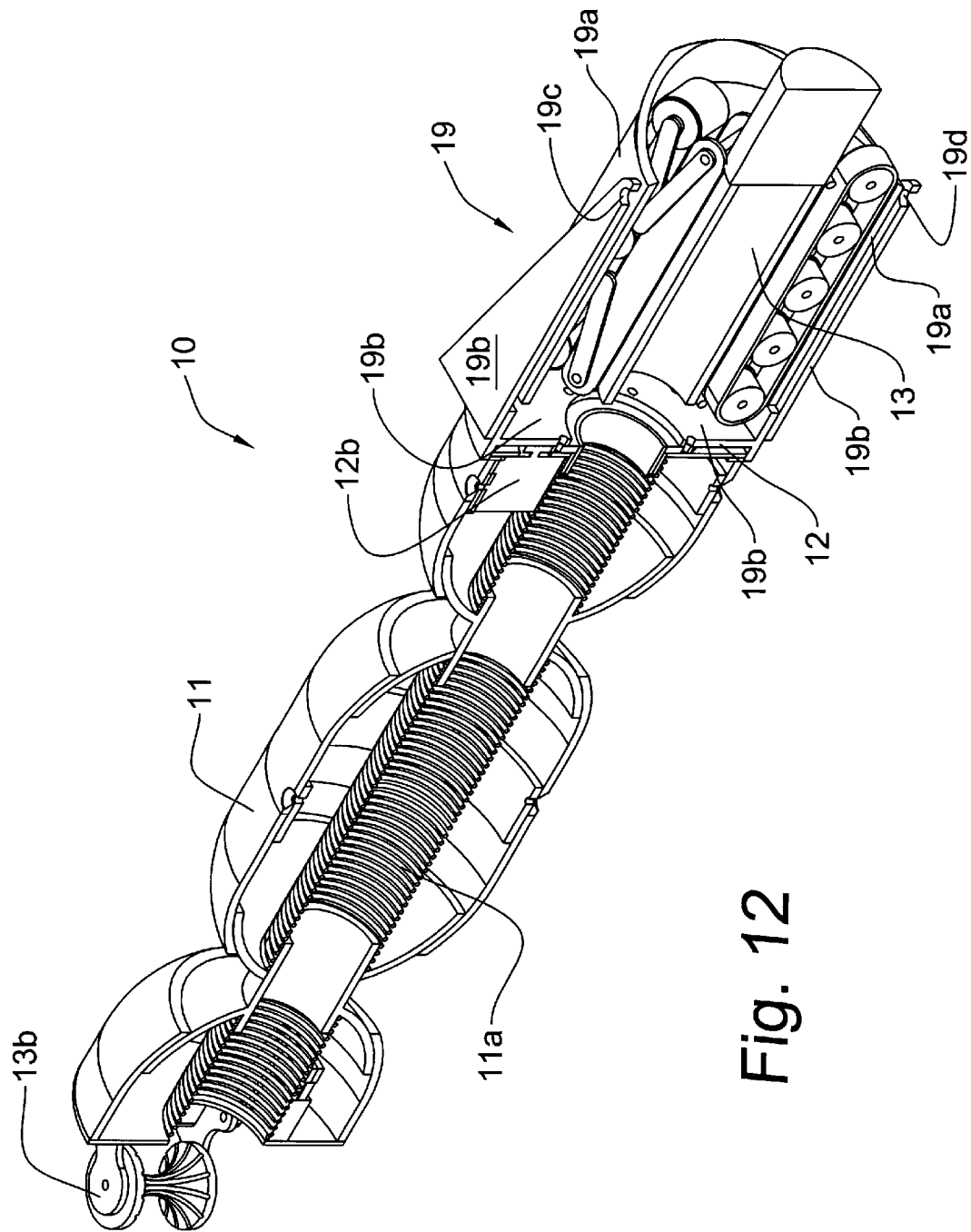
FIG. 12 is a perspective view of a tri-track mule according to a third embodiment of the invention.
Figure 13:
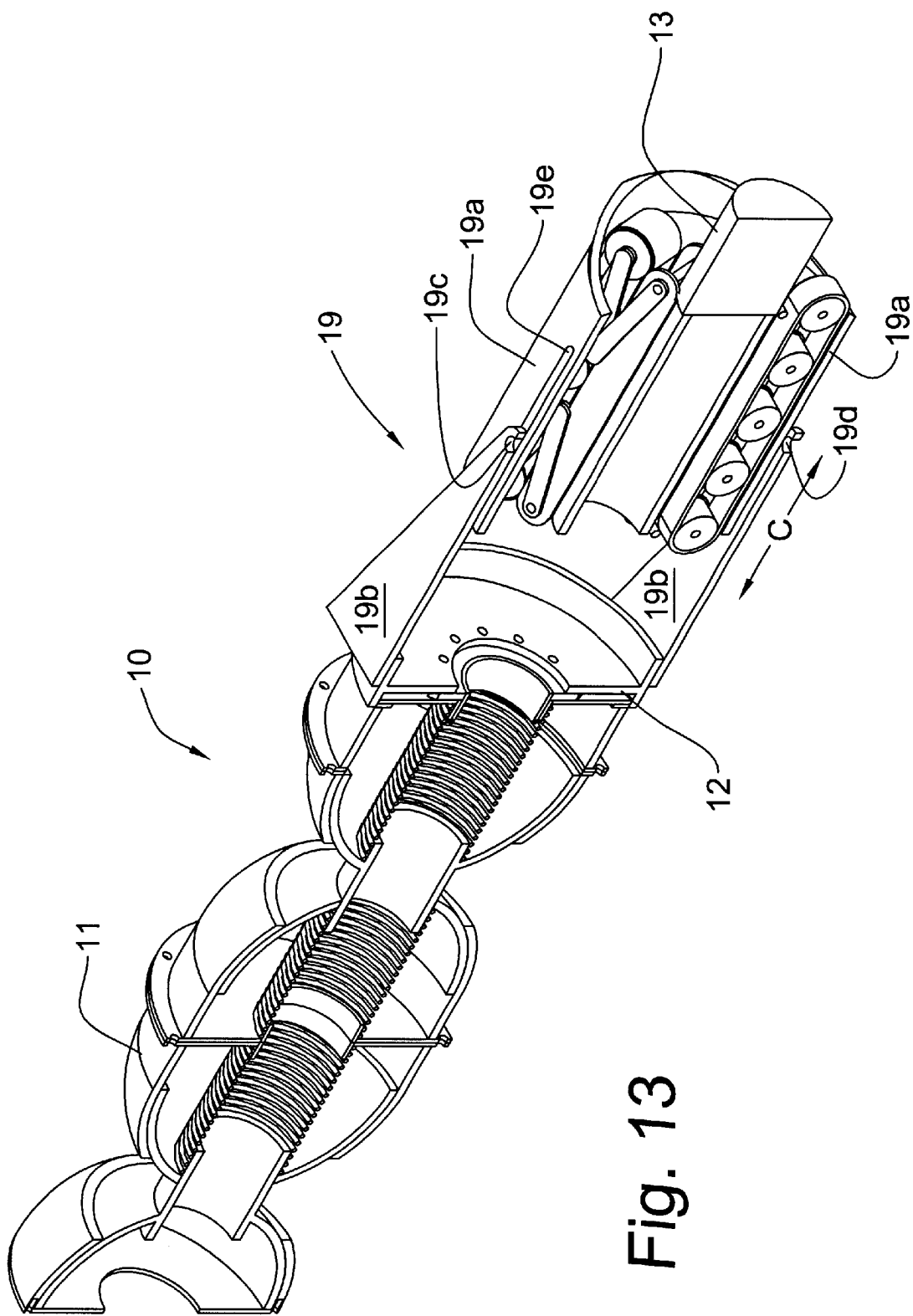
FIG. 13 is a perspective view of a tri-track mule according to FIG. 12 wherein the mouse transport housing is extended prior pivoting to align with a sub-conduit.

In another embodiment, as shown in FIGS. 8,12, and 13, the mule 10 is fitted with an additional and smaller robotic vehicle or mouse 13, transported by the mule. The mouse 13 is particularly adaptable to accessing laterally intersecting sub-conduits. In this embodiment each track assembly 20a, 20b, 20c is attached to the main body 11 via a pair of pivotable scissors-like linkage assemblies 23. These linkage assemblies 23 are pivotally connected to the main body 11 as well as to the track housing 30, and allow for an outward displacement of the track assemblies 20a, 20b, 20c without the accompanying the forward displacement that results in the first parallelogram-like embodiment of the mule 10 as described in the previous embodiment.

The track assemblies 20a, 20b, 20c can again be displaced radially using screws, pneumatic cylinders or a combination including air diaphragms 25. Alternatively, it clear to a skilled person that many different centering means can be employed including a reverse scissors-like linkage assembly and screw (not shown) such as that found in a common car jack design.

Having reference to FIGS. 12 and 13, the mouse 13 is transported in an articulated housing 19 extending from the mule 10, the housing comprising a tubular transport housing 19a supported from the head assembly 12 by connecting brackets 19b. Referring to FIG. 12, the connecting brackets 19b are attached to the head assembly 12 and also to the transport housing 19a at two pivot points 19c, 19d. The pivoting of the transport housing 19a is accomplished by an actuating cable or a motor (not shown).

The housing 19a supports the mouse for transport to and for subsequent deployment into sub-conduits. The mouse 13 is a self-centering robotic vehicle like the mule 10 and employs similar tri-track apparatus 20a–20c to provide mobility. For transport, the tracks of the mouse 13 are driven to their collapsed or radially compressed state for fitting within the transport housing 19a. Preferably the housing 19a and supported mouse 13 are supported close to the head assembly 12 so as to position the mouse's cantilevered center of gravity close to the mule 10 during transport. For deployment, the housing 19a is extended outwardly and axially in linear guides 19e until the housing 19a can be pivoted or rotated. The extension of the transport housing 19a is aided with cooperation between the pivots 19c, 19d and the guides 19e. at least one of the pivots 19c or 19d has linear edges which engage closely with the guides 19e and thus the transport housing 19a is unable to pivot. However, at the furthest extent of the guides 19e they are locally widened to permit rotation of the pivots 19c, 19d and thus enable rotation.

To deploy the mouse 13 into a sub-conduit 2, the transport housing 19a is aligned with the sub-conduit by pivoting the housing about pivot points 19c, 19d.

Preferably, where the mouse 13 is not entirely self-contained for performing its tasks, a second umbilical 5b connects the mouse 13 to remote power, supply and control sources. The mouse 13 must drag the umbilical 5b along the sub-conduit 2. Normally the mule 10, being a more robust robot pulls the first and second umbilicals 5a, 5b down the main conduit 1, however, for deployment along sub-conduits 2, the mouse 13 continues to demand umbilical 5b from the supply or from surface. As the mouse 13 is typically less capable for pulling the necessary loads at deep conduit locations, the mule 10 feeds the second umbilical to the mouse 13, via opposing and driven umbilical drive rollers 13a, 13b (one roller shown) attached at the rear of the main body 11, and a guide tube 11a through the mule's main body 11 and to the mouse 13. The guide rollers 13a, 13b are driven by motors (not shown).

Two opposing notches 19f are present at the back of the transport housing 19a, which enable rotation of the housing 19a despite the presence of the umbilical 5b but also aid in the guiding and support of this second umbilical 5b when the housing 19a is aligned and the mouse 13 is deployed.

Returning to FIG. 8, a tape head 15, suitable for taping cable, conductors, or small diameter conduits to the inside of a larger conduit 1,2, can also be attached to the housing's connecting bracket 19b by means of a spacing bracket 15a. It is well understood by the skilled person that a cable, conductor or small diameter sheath or conduit are all flexible, elongated members which can reasonably be taped to the inside of a larger conduit. The tape head 15 is spaced far enough from the transport housing 19a so as not to interfere with its pivoting action and lateral deployment of the mouse 13 into sub-conduits 2. The tape head 15 further comprises a roll supply of tape 15b, a pivoting linkage 15c, pre-forming and guiding rollers 15d, and two pneumatic air-rams 15e.

Figure 14:
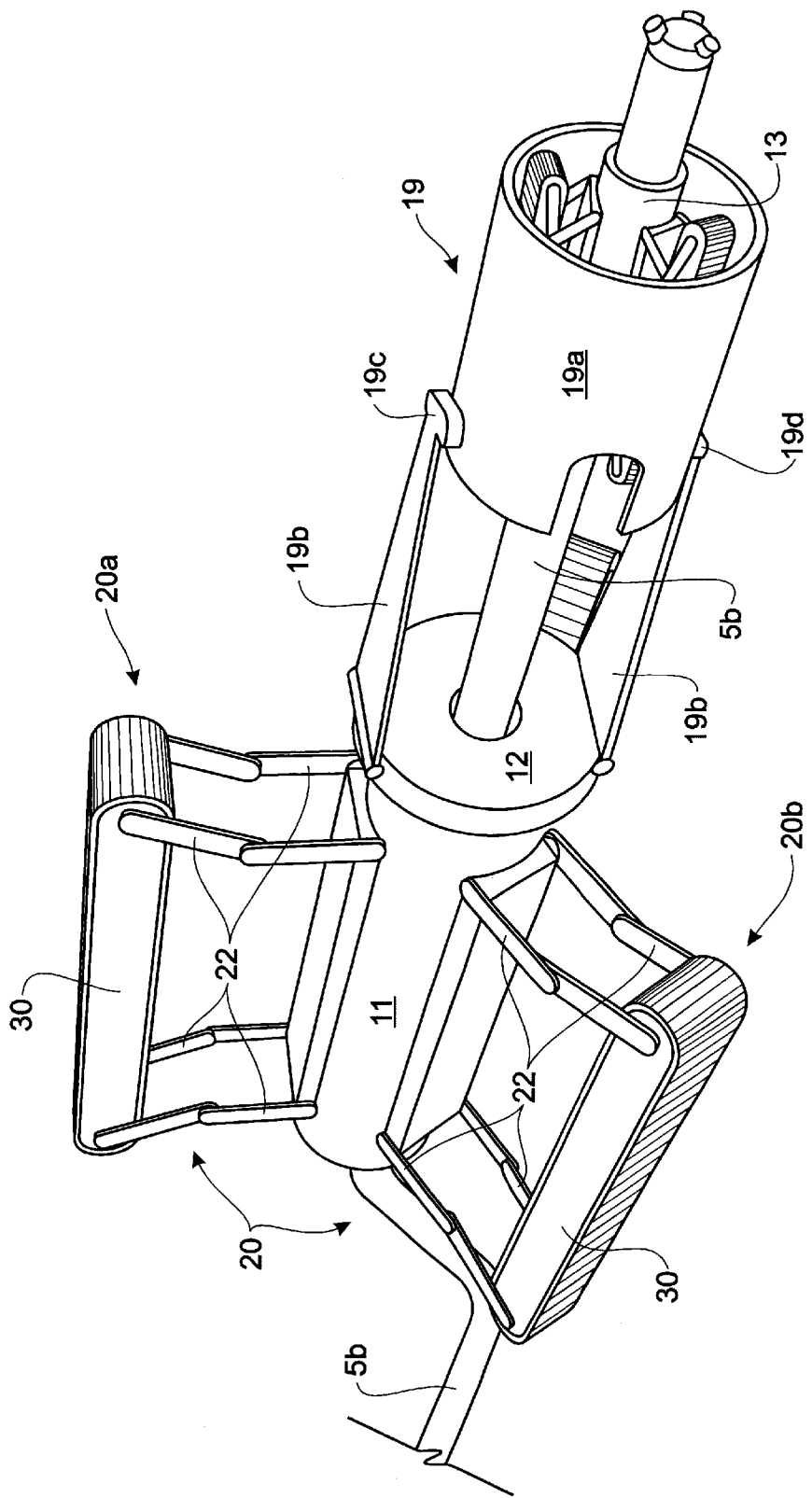
FIG. 14 is a perspective view of a tri-track mule according to a forth embodiment of the invention deployed inside a main conduit.

Returning to FIG. 14, the mule 10, a transport housing 19a and a mouse 13 are shown deployed inside a main conduit 1.

A first umbilical 5a connects the mule 10 to a remote control, supply and power source (not shown). The second umbilical 5b similarly connects the mouse 13 to a remote control, supply and power source. The second umbilical 5b passes through the hollow main body 11 to the mouse robot 13. Two opposing notches 19f are present at the back of the holding cylinder 19a which avoid interference when pivoting and aid in the guiding of the second umbilical 5b when the transport housing 19a is aligned and the mouse 13 is deployed.

In some cases, it is difficult to anticipate the elongated dimensions of the transport housing 19a necessary for either housing the mouse 13 or for bridging and guiding the mouse 13 from the mule in the main conduit 1 to the sunb-conduit. Accordingly, an articulated arm 18 can be provided for adapting and accessing subconduits 2 substantially independent of the diameter of the main conduit 1. Having reference to FIGS. 15a and 15b, the moveable arm 18 is illustrated in plan and in side views.

Having reference to FIGS. 5, 15a–17, such an articulated arm 18 is capable of aligning with an intersecting sub-conduit and guiding the mouse from the transport housing to deploy the mouse into the sub-conduit. The arm 18 comprises a generally segmented cylindrical body 50 having a plurality of pivotally-connected chevron-shaped ring-like segments 51.

Shown in an unactuated state in FIGS. 15a, 15b, the chevron-shaped ring segments 51 are arranged in an alternating vertical and horizontal pivots which pass through the arm's axis; unlike a conventional herringbone arrangement having a plurality of vertical pivots. While vertical pivots enable a lateral curving movement, the addition of alternating horizontal pivots also enable vertical curving movement. To minimize the chance of jamming of the arm against the bottom of a conduit, the vertical curving movement is limited by stops at the bottom of alternate segments, preventing free downward rotation of the alternating segments. This arrangement provides a good range of motion and allows the arm 18 to articulate as is further described below.

Figure 16:
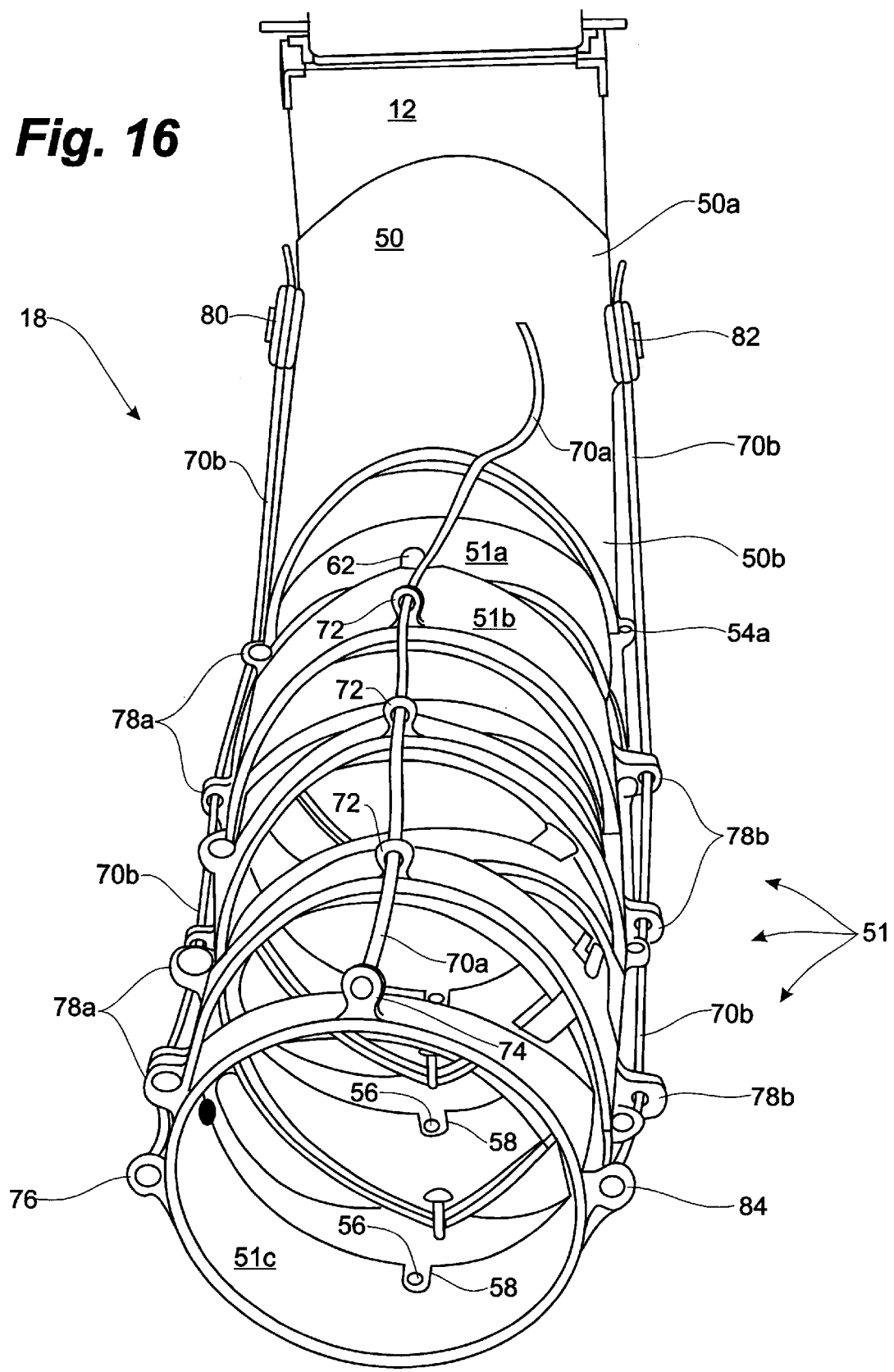
FIG. 16 is a perspective front view of the articulated arm of the embodiment shown in FIGS. 15a, 15b, attached to and extending from a mule according to FIG. 4.

As shown in FIG. 16, the arm 18 attaches to the mule 10, at a first end 50a which acts also as the transport housing 19a for the mouse. At a second end 50b of the transport housing 19a, a first segment 51a is pivotally connected at two lateral and opposing pivot points 54a 54b. The outside diameter of the first segment 51a is slightly smaller than the inside diameter of the cylindrical body 50, and by virtue of the lateral pivot points 54a 54b, the first segment 51a is capable of articulating in an up and down plane relative to the cylindrical body 50.

As there are rarely sub-conduits which intersect below the mid-point of a main conduit 1, it is typically unnecessary to actuate the arm below the axis of the cylindrical body 50; actually it is desirable to prevent the arm 18 from downward articulation. To prevent such downward articulation, stops 56 and notch 58 arrangements are used. A stop 56 projects upward from the bottom of the cylindrical body 50 at the second end 50b and from each alternate segment 51. The notch 58 at the bottom of the first segment 51a fits around and engage the stop 56 when the first segment 51a is articulated to align with the horizontal plane of the cylindrical body 50; thereby preventing the first segment 51a from articulating downward past the horizontal plane, yet without impeding lateral movement. As there is no stop and groove arrangement on the top side of the body 50 and first segment 51a, the segment 51a is free to articulate upwards relative to the cylindrical body 50.

A second segment 51b, with the same inside and outside diameter as the cylindrical body 50, fitting over top of the first segment 51a, is pivotally connected to the segment 51a at a top 62 and bottom (not shown) pivot point. The second segment 51b is therefore capable of articulating in side to side plane relative to both the cylindrical body 50 and first segment 51a. As both left and right side-to-side articulation is desirable no stop and notch arrangements are provided between the first 51a and second 51b segments. The side-to-side articulation will therefore only be constrained by the exact shape of the chevron peaks; with steeper peaks providing a greater range of motion.

Additional and alternating segments 51a, 51b, 51a, . . . are connected together in the manner described above, with additional and alternating stop 56 and notch 58 arrangements to prevent downward articulation. The embodiment shown in FIGS. 6 and 7 have five additional segments 51 providing the arm 18 with a 90 degree range of motion in the up and down plane and a 180 degree range of motion in the side-to-side plane.

Figure 17:
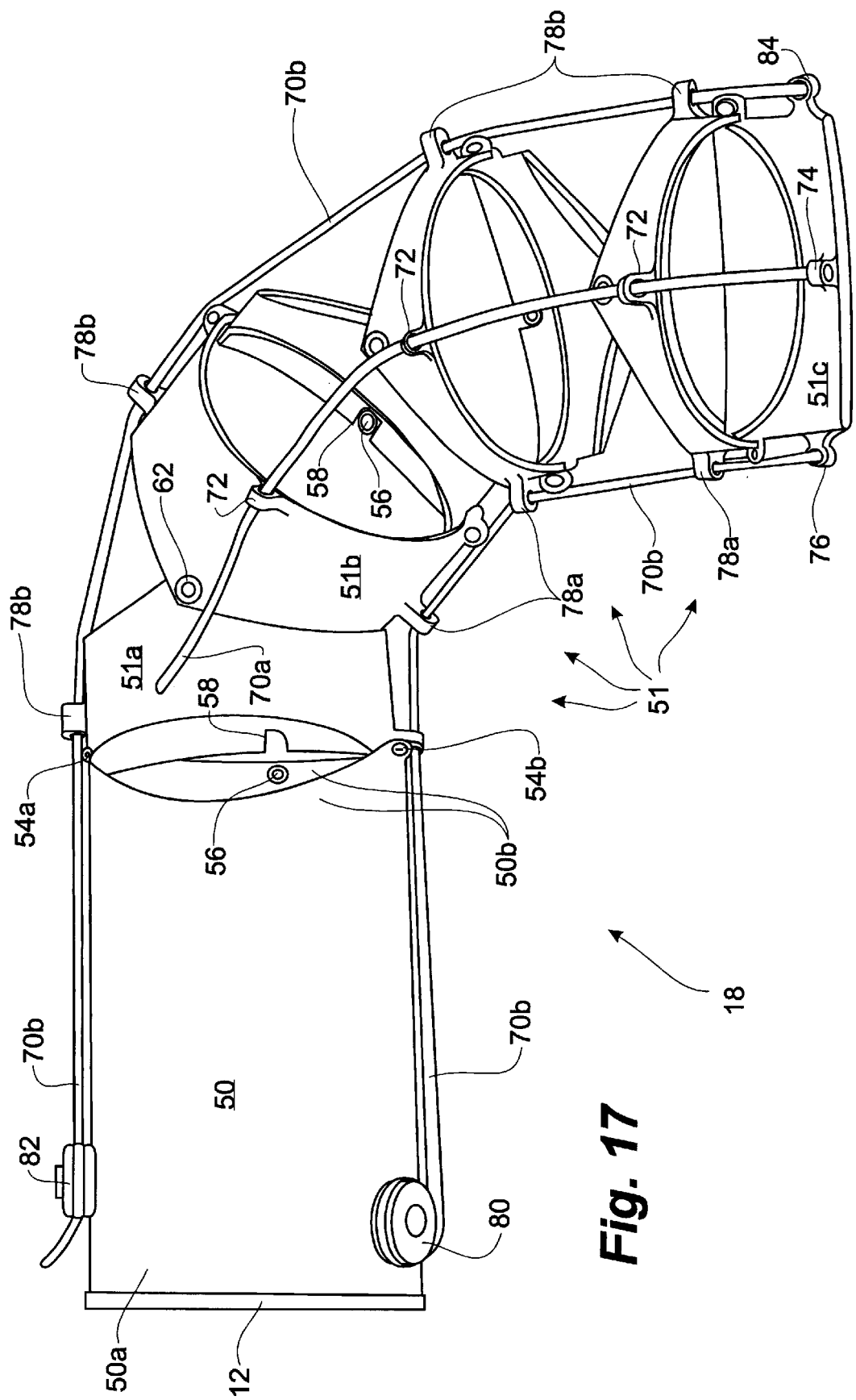
FIG. 17 is a perspective view of the articulated arm of the embodiment shown in FIG. 15a, 15b, shown actuated to one side, such as for alignment to a sub-conduit.

Turning to FIG. 17, the articulation of the arm 18 is controlled by means of cables 70a 70b extending along the outside of the arm 18. A first cable 70a connects at a connecting point 74, runs along the top of the arm, through a guides 72 on the top of each second segment, and winds around a first spool (not shown) driven by a first reversible motor (not shown). To articulate the arm 18 upwards from its horizontal resting position, the motor turns the spool to wind the cable 70a up around it, thereby exerting a pulling force at connection point 74 and raising the segments 51. To lower the arm 18, the motor reverses, unwinding the cable 70a from the spool and the segments 51 lower due to the force of gravity.

A second endless cable 70b connects at a connecting point 76 on one side of the last segment 51c, runs along the sides of the arm 18 through loops 78a on each second segment, loops around a first guide 80, winds around a second spool (not shown) driven by a second reversible motor (not shown), loops around a second guide 82 runs along the opposite side of the arm 18 through a loop on each second segment 78b and connects at a connecting point 84 on the opposite side of the last segment 51c. To articulate the arm 18 side-to-side, the second motor turns the second spool. Depending on the direction of rotation of the spool a pulling force is exerted at either connection point 76 or connection point 84 while at the same time an equal reduction in pulling force is experienced at the opposite connection point 84 or 76 as the case may be. The two sets of motors and spool may be located either on the cylindrical body 50 or on the mule 10.

Figure 18:
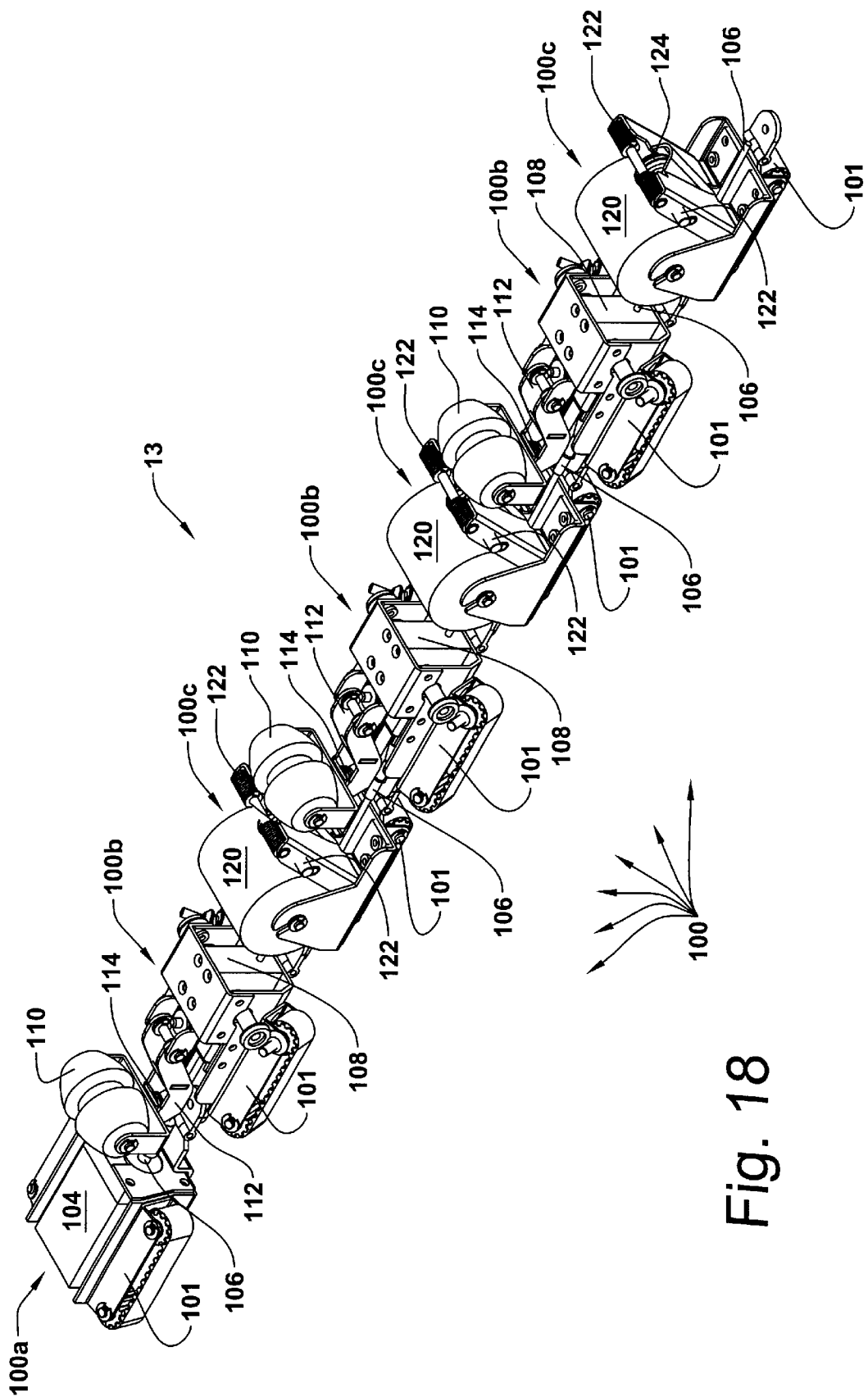
FIG. 18 is a perspective view of a plurality of linked mouse robots adapted for taping.

Having reference to FIG. 18, the length of the articulated arm is also particularly well adapted for transporting a mouse of longer and enhanced design. A plurality of mouse robots 13,13,13 are configured in combination as a series of drive and taping vehicles for deployment into a sub-conduit. The mouse robot 13 comprises a plurality of linked sub-units 100 each with at least one track assembly 101. The sub-units include at least one drive unit 100a, one guide unit 100b and one tape unit 100c. The guide unit 100b has a rolling guide 110 mounted on a flexible arm 112. The rolling guide 110 is kept in contact with the inner wall of the sub-conduit by means of a spring 114 which presses the arm 112 upward. The tape unit 100c holds a roll of tape 120 which is dispensed, through a series of rollers 122 and guides 124, to the inside wall of the sub-conduit. Multiple guide 100b and tape units 100c are desirable when taping inside a long section of sub-conduit and one roll of tape 120 would carry an insufficient amount of tape to tape the entire length of sub-conduit (the size of tape roll 120 being constrained by the small inside diameter of the sub-conduit).

The drive unit houses a motor 104 which connects to the other sub-units 100 by means of a flexible, discontinuous drive shaft 106. The drive shaft 106 passes the torque from the motor 104 to a gear box 108 in each guide unit 100b while passing through each tape unit 100c in order to connect to the gear box 108 in a subsequent guide unit 100b. The gear box 108 in each guide unit 100b, using the torque supplied to it from the motor 104 via the drive shaft 106, powers a drive wheel 130 which in turn powers its track assemblies 101. The track assemblies 101 on the guide units 100b in turn drive the entire linkage of sub-units 100. The track assemblies 101 of the other sub-unit types 100a, 100c therefore simply move in response to the force created by the guide units 100b.

Figure 19:
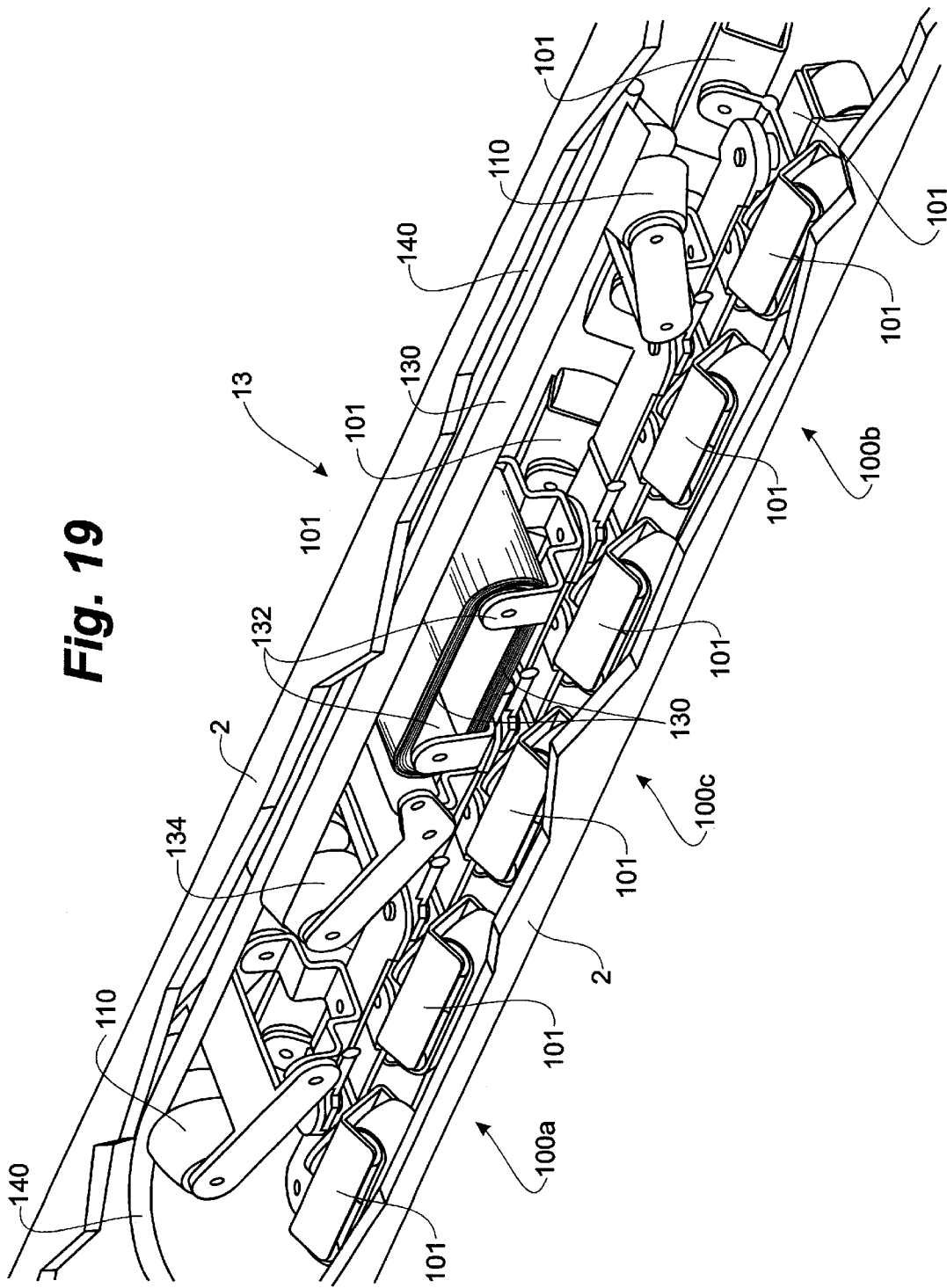
FIG. 19 illustrates another embodiment of a plurality of linked mouse robots placing and taping a flexible member inside a sub-conduit.
Figure 20:
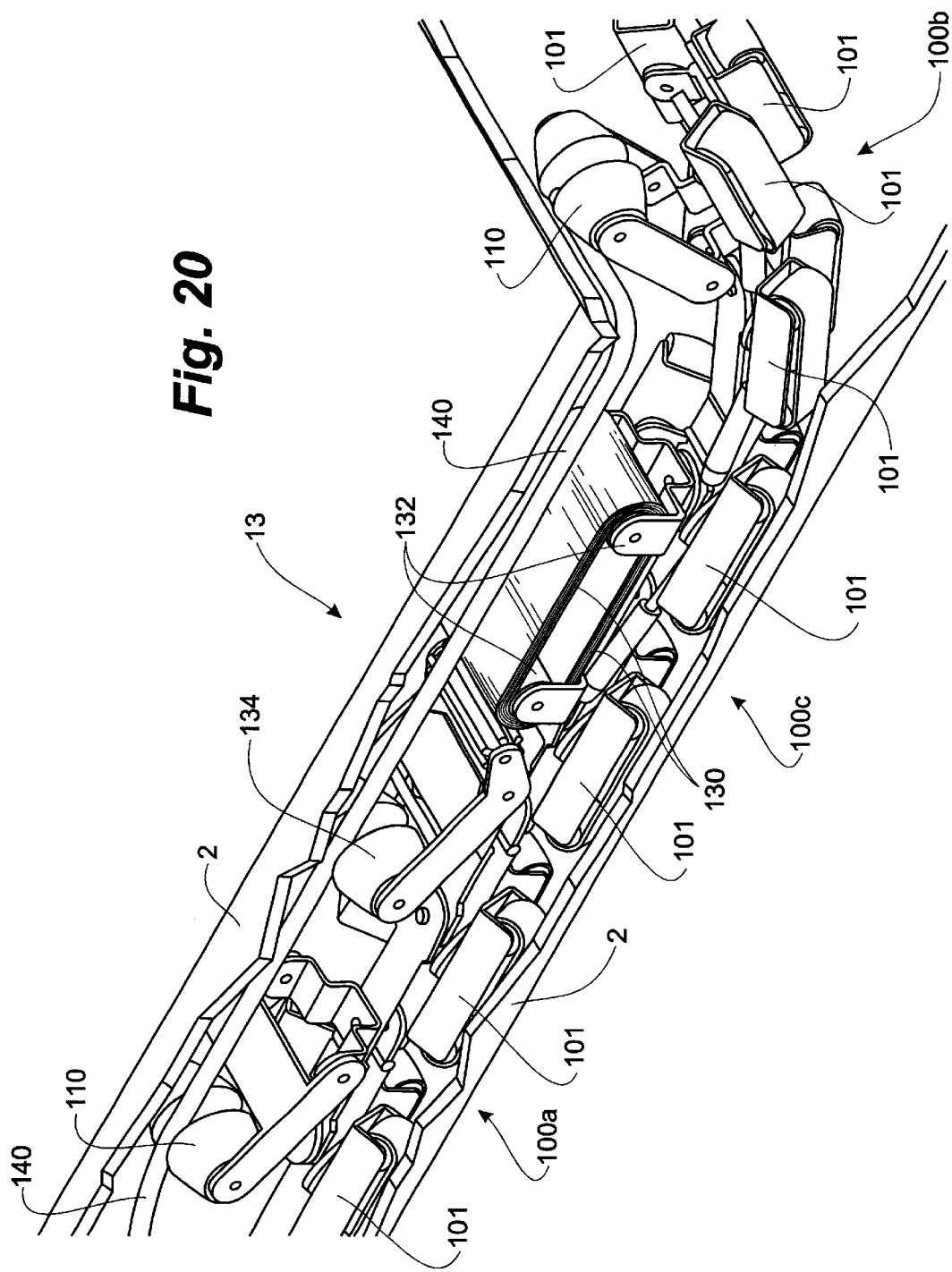
FIG. 20 illustrates the plurality of linked mouse robots of FIG. 19 navigating a curve or branch in the sub-conduit while placing and taping a flexible member.

FIGS. 19 and 20 show a second embodiment of a plurality of mouse robots 13,13 configured as a taping vehicle for deployment into a sub-conduit 2. This second embodiment is similar to the first embodiment described above in that it comprises at least one drive unit 100a, one guide unit 100b and one tape unit 100c.

Unlike the first embodiment described above, the sub-units 100 in this mouse robot 13 have at least six track assemblies 101 each, arranged as two pairs of three track assemblies 101 to provide further support and stability to the unit.

As an alternate method to transport a sufficient length of tape through the small-diameter sub-conduit 2, the tape 130 is constrained to the size of the roll as in the first embodiment, but instead is supplied as an endless elongated band wrapped around two rollers 132 spaced some distance apart on the taping unit 100c. The tape is fed through a roller 122 to a rolling guide 134 which applies it to the inside of the sub-conduit 2.

The drive unit 100a in this embodiment has a rolling guide 110 like that on the guide-unit 100b which assists in placing and aligning a flexible member 140 along a designated path of the inside wall of the sub-conduit 2, prior to being taped.

Apparatus Examples:

Mule

The mule as illustrated in FIGS. 4–6 was configured to pack or transport a mouse through a main conduit and had the following general specifications including: a tri-track drive, each track assembly being 28" long by 4.5" wide, hydraulically or electrically driven straight run unit, fitting inside conduits from 16" up to 24", with a maximum pressure of 120 lbs/sq. in. on the inner surface of the conduit and having variable and reversible speeds of up to 120 ft/min. The tracks could traverse a minimum side bend of 16" radius. For pulling umbilicals, the mule has a unit line pull of 1000 pounds at maximum drive track torque. Optional attachments included up to six digital video cameras (3 forward facing and 3 rear facing), pressure sensors for monitoring track pressure and umbilical tension, multiple wash head assemblies, drill head assemblies, grout form packer assemblies, taping head assemblies, and lateral line grinder/cutter assemblies.

Mouse

In the case of a mouse 13, the specifications for each mouse generally included: a tri-track drive 3" long, 0.75" wide, electrically driven, with a maximum pressure of 20 lb/sq. in. on inner-surface of pipe, a variable travel speed of up to 10 ft/min, and an umbilical unit line pull at maximum torque of 250 lbs. The line pull varied depending on the number of inline mouse units deployed. Optional attachments included: up to two digital cameras (one forward facing, one rear facing), pressure sensors for track pressure and line pull, wash head assemblies, taping head assemblies, and lateral line packer head assemblies.

Increased tape supply and umbilical pulling capability was provided by providing a chain of seven mouse robotic vehicles, which were configured as a fibre optic (conductor) placing, aligning and taping unit. Enhanced specifications for the taping unit embodiment included: ability to carry multiple rolls of tape, handling tape rolls up to 6" wide, carrying and deploying up to 2500' of tape on a single pass, installing up to 4 conductors in a single pass, and pulling up to 1000 pounds of conductors in a single pass.

Clearly, other embodiments of the taping vehicle can have different specifications. For instance, another smaller embodiment might carry only 100' of 2" tape, and would only pull ¼" diameter conductor up to 350'.

Operational Examples:
Spray Coating Rehabilitation:

An average rehabilitation job for a system of conduits (main conduits and sub-conduits) such as wastewater or storm sewer lines typically includes the following steps. A vacuum truck is used for cleaning the main pipeline conduits. The work done by this unit is only on the main conduit. A wash-and-vacuum unit works with the vacuum truck to wash and clean the lateral pipeline sub-conduits and also does a post-wash of the main conduits. Then all conduits are vacuumed dry. At this stage diaphragm plugs are placed in the lateral sub-conduits, which keep effluent from re-entering the cleaned pipes. The wash-and-vacuum unit is connected to the vacuum truck. This unit is equipped with a video and data monitoring system, and also controls a mouse which accesses to lateral subconduits for cleaning. This unit also carries supplemental spray components in totes or magazines. The material in the magazines are transferred to the main spray system as necessary. High air flow fans are placed to blow air through the cleaned sections of pipe which helps control humidity and further dries the pipe.

Figure 21B:
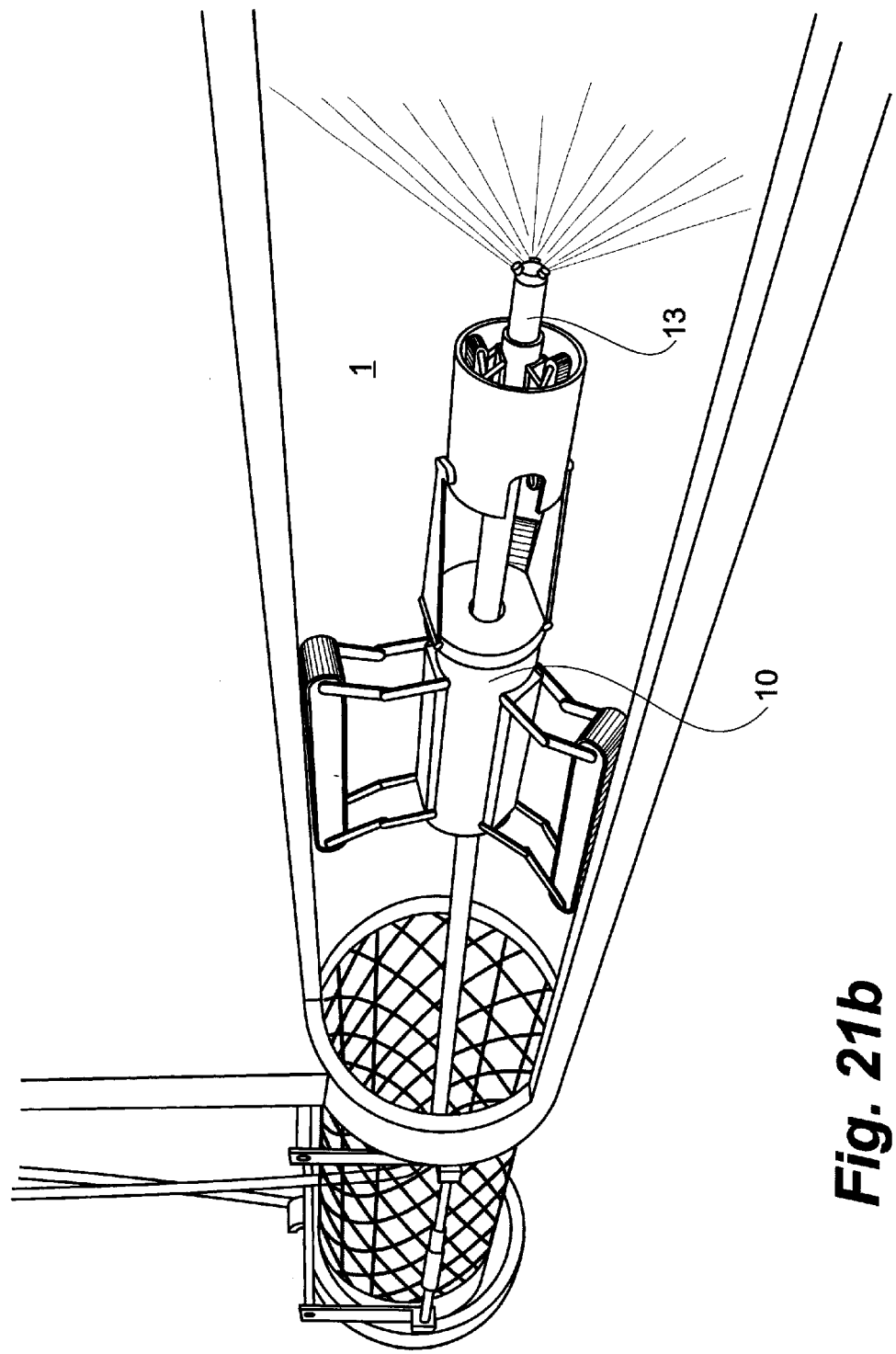
Figure 21C:
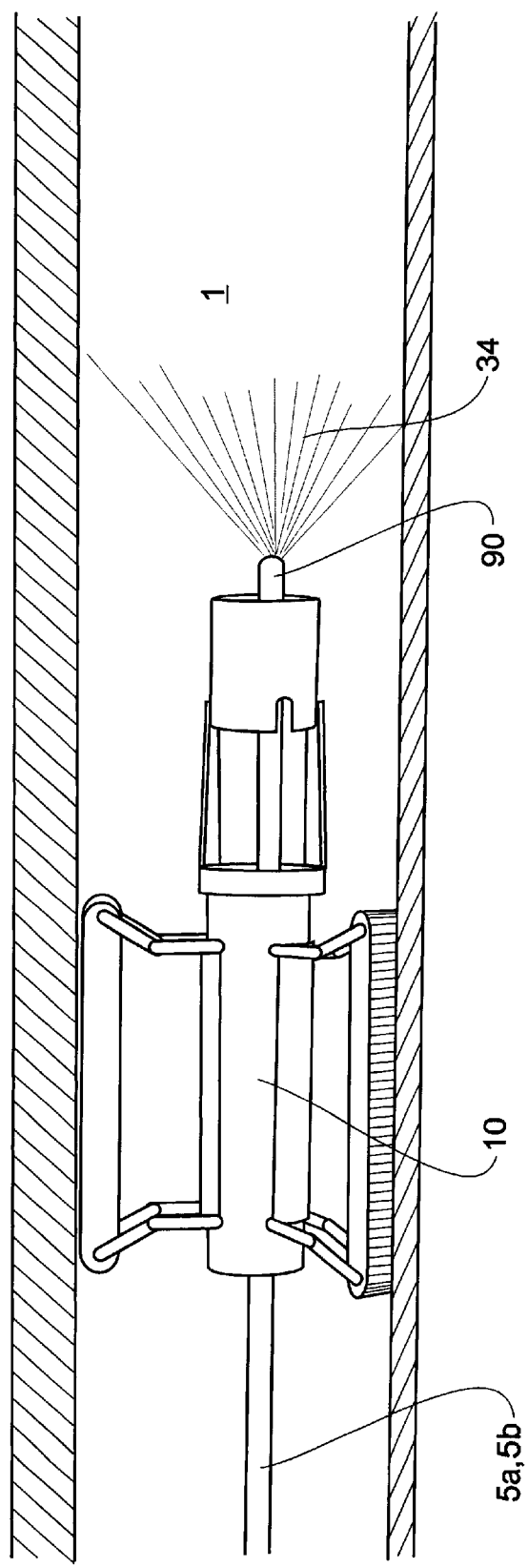
Figure 21D:
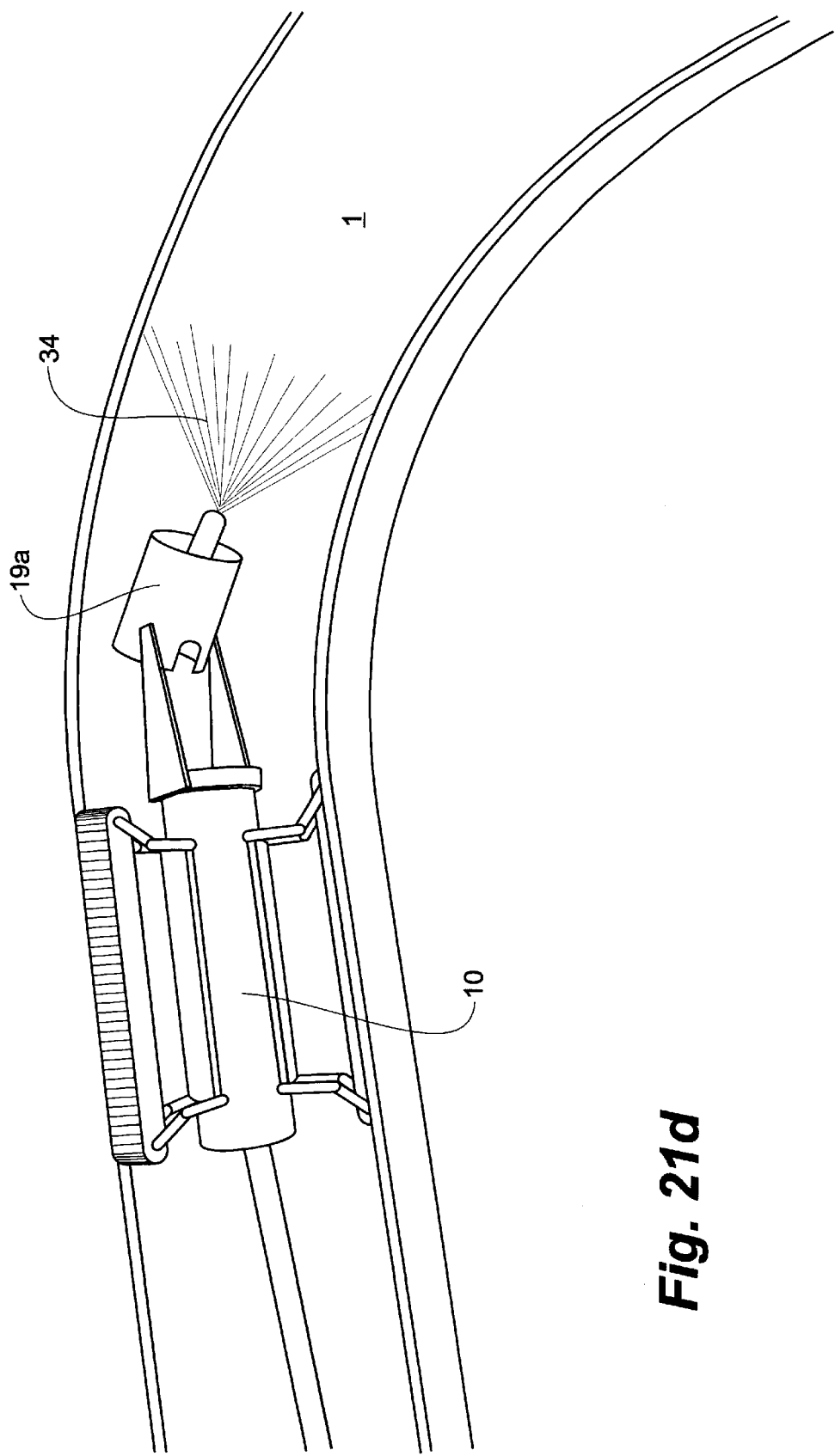
Figure 21E:
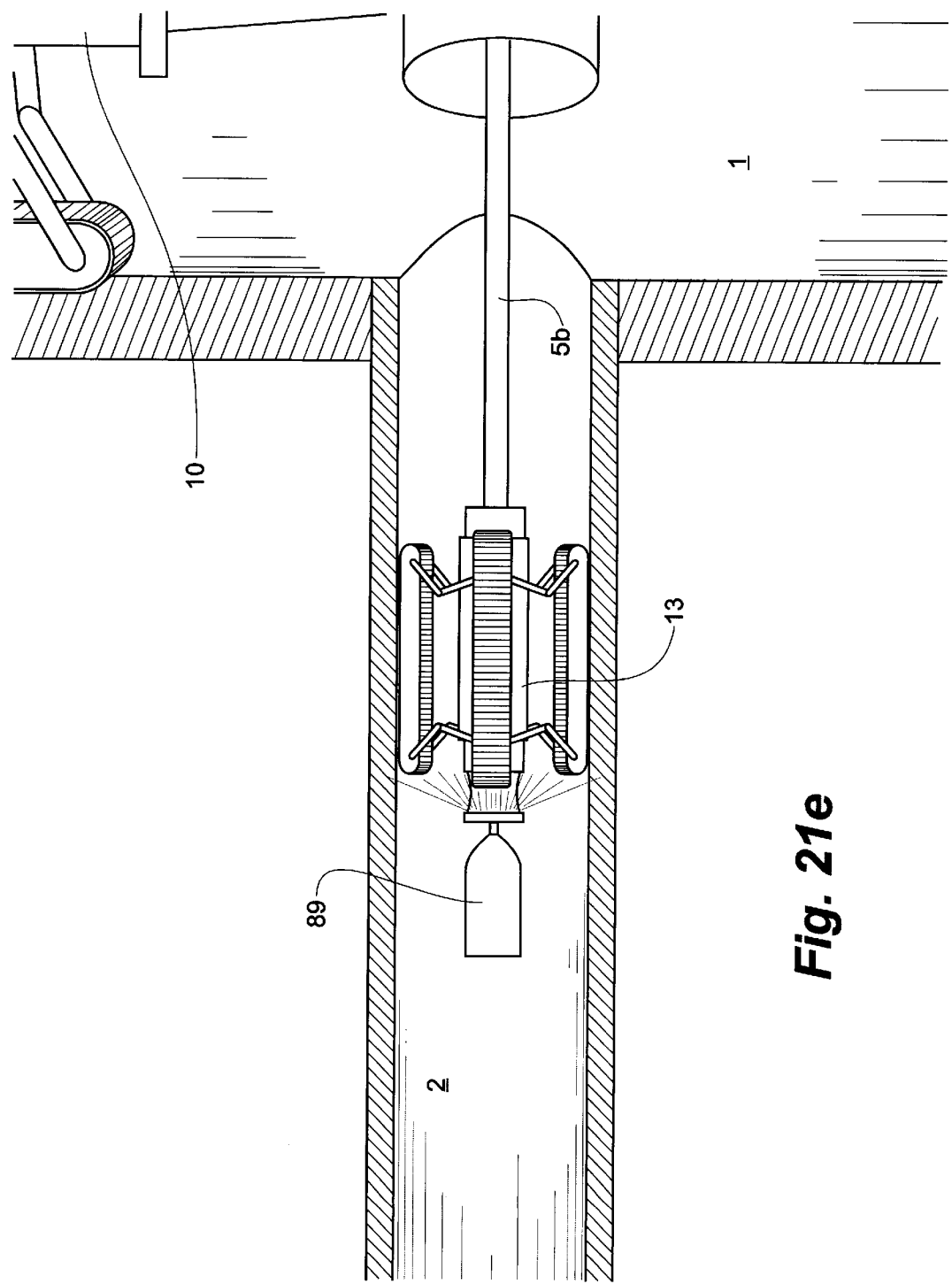

Spray washing of the conduit walls may also be conducted using a suitable washing tool affixed to the mouse which is supportably retained in the transport housing with the wash and polyurethane spray nozzles extending substantially axially along the conduit.

The rehabilitation process is typically conducted when the system of conduits is already cleaned and dried using the wash and vacuum unit or an adapted mule and mouse. Each section can be cleaned, spray coated, and back in operation within a few short hours, even for sections of conduit in the order of 2700 feet having a conventional residential frequency of lateral sub-conduits.

Once clean, typically there are two and sometimes three robotic vehicles employed to rehabilitee the system of conduits. The lead unit or mouse carries the majority of the monitoring and video equipment and can enter subconduits from 8" to 20". A trailing unit or mule carries the mouse in and out of larger conduit and enables deployment of the mouse into the lateral sub-conduits . A typical mule configuration can enter pipes from 12" to 60". An optional tertiary unit can be employed merely to pull umbilicals through the conduits. It would generally not be required to transport monitoring or video equipment.

The mule and mouse are driven as far into the pipe as required to commence rehabilitation of the system of conduits. The mouse is adapted to carry nozzles capable of dispensing plural part polyurethane coatings. A heated umbilical trails behind the mouse and behind the mule for conducting the two parts of the polyurethane along with the communications, controls and power supplies. Setting up for receiving the mouse spray unit and mule includes placing bridging track units in the pipe, setting up the pumps, and correlating the computer data, and start recording of the data. Measurements of the pipe and recording of data include the density of pipe, laser measurement of the interior diameter of the pipe, the humidity inside the pipe, and a video record of the pipe to check for irregularities, water intrusion.

There are four variables that determine thickness of the sprayed components: the speed at which the mouse is extracted, the fluid temperature, the nozzle pressure, and the flow rate. The plural part spray compound is typically composed of resin and isocyanate. The resin consists of urethane and urea. Depending on data collected (ie. humidity and wall dampness) a balance between the two compounds is adapted as is known to those skilled in the art. BASF and Uniroyal are well known suppliers which aid in selecting ratios for particular conditions. Typically, the sprayed compound takes 3 to 10 seconds to set with a total cure time of 15–30 minutes.

In order to spray the lateral sub-conduits, the spray units can either be re-inserted after complete treatment and curing of the main line or the main conduit is only sprayed in retreat up to a lateral sub-conduit at which time the lateral is rehabilitated before resuming rehabilitation of the main conduit.

For each lateral, position and conduit condition measurements and video recording can be performed as was performed the main conduits.

In cases where discharge waste or effluent may be anticipated down the laterals, it is preferably to temporarily block the lateral, usually at a property line boundary to avoid issues regarding trespass. Accordingly, the mouse extracts a packer or plug from a magazine mounted off of the mule before deploying down the lateral. The mouse advances to the property line and engages the plug.

The mouse then retreats and spray coats the lateral as the mouse spray unit is extracted. Upon completing the lateral sub-conduits, the plugs are removed.

Having reference to FIGS. 21*a*–21*f*, a selected sequence of operations is illustrated for spray coating rehabilitation treatment of a system of conduits. One approach is to initially perform a cleaning and data acquisition pass (laser, GPS, and sonic dimensional and location data) is made. At the conclusion of one or more passes of the cleaning, the mule and mouse are left at a distant position and are ready for conducting treatment. In this case, a protective coating is applied.

In FIGS. 21*a*–21*g*, conduits 1 and sub-conduits 2 are being cleaned and coated. In more detail, the mule and mouse are introduced to the system of conduits 1,2. Typically in the case of a manhole access to an underground conduit, the conduit is interrupted and the mule and mouse are lowered down an access shaft 150 inside a temporary and expandable housing 155 as necessary to bridge the interruption in the main conduit and act as a launch off point for the mule. One end of the expandable housing 155 is directed to catch on an exposed edge of the conduit 1, at a contact point 160, which aids in aligning the housing 155 with the entrance of the conduit 1. The housing 155 is telescopically expanded lengthwise so as to wedge across the shaft 150 in alignment with the conduit 1 thereby allowing the mule 10 to deploy along the conduit 1.

The mouse 13 is transported along the conduit 1 by the mule 10 inside its articulating transport housing 19*a*. Both robots 10, 13 are connected to a remote supply, power and control source via umbilicals 5*a*, 5*b* respectively. The umbilical cable 5*b* connected to the mouse 13 passes through the mule robot 10 which aides in the subsequent deployment of the umbilical to the mouse 13 as it traverses subconduits 2.

FIG. 21*b* can represent a cleaning pass traveling forwards and backwards, or can represent the final protective coating spray 34 before retrieval of the mule 10 and mouse 13.

Turning to FIGS. 21*c*–21*g*, the coating process is conducted as the mule 10 is retrieved.

FIG. 21*c* illustrates spraying of a coating 34 in the main conduit 1. The nitrogen purging nozzle 90, carried by the mouse, is used to apply polyurethane coating 35 to the conduit 1. As shown in FIG. 21*d*, when traversing standard bends in the conduit, the transport housing 19*a* is pivoted to align the mouse 13 and spray nozzle 90 substantially with the center of the conduit 1. In FIG. 21e, when a lateral sub-conduit 2 is reached, the coating spray is purged, and the transport housing is pivoted to align with the sub-conduit 2. The mouse 13 is directed into the sub-conduit 2. If not already cleaned, the mouse 13 can traverse the sub-conduit 2 to clean and condition the sub-conduit 2.

Figure 21F:
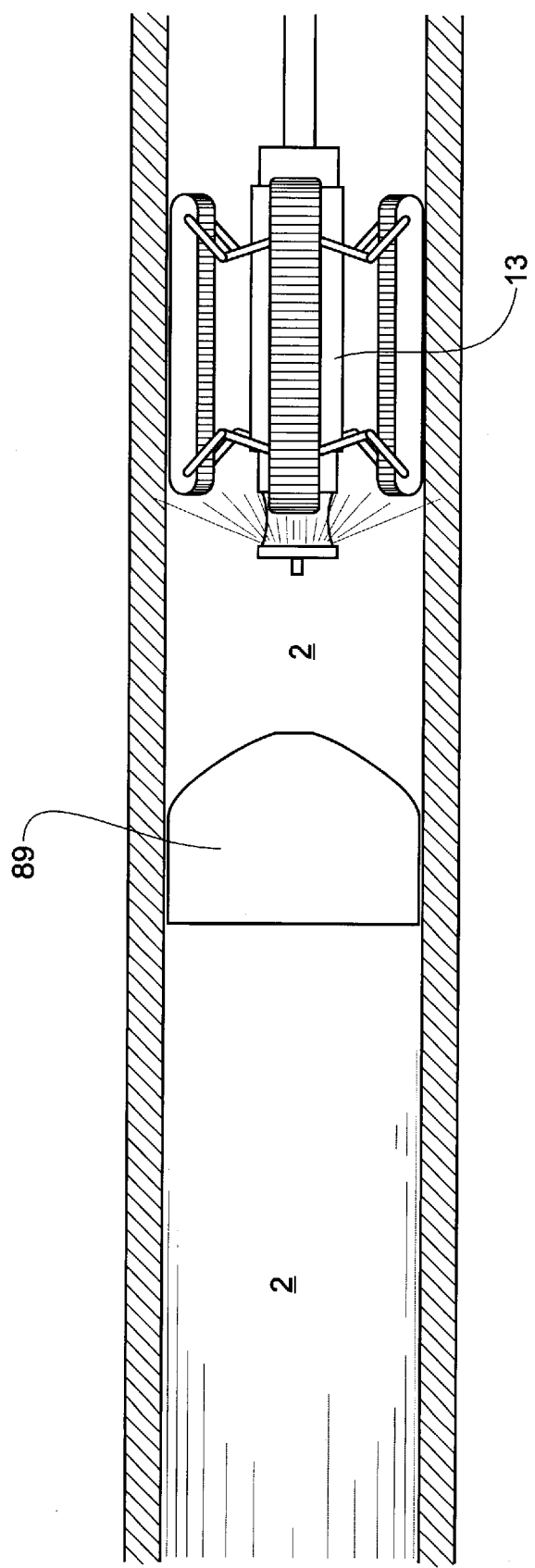
Figure 21G:
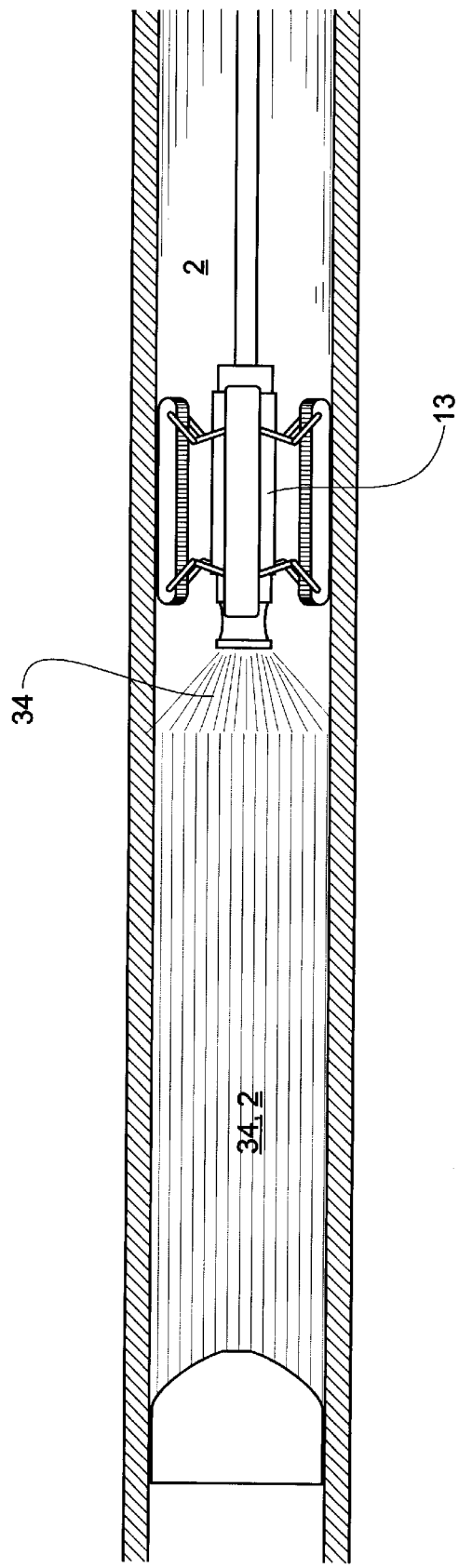

Referring to FIGS. 21e–21g, if there is a fear of an effluent discharge during or prior to the spraying process, an expandable plug 89 can be temporarily deployed to block the sub-conduit, such a deployment perhaps being combined with the cleaning step. At FIG. 21e a plug 39 is transported by the mouse 13 to a safe position in the sub conduit and the mouse is retrieved as shown in FIG. 21f. Referring to FIG. 21g, on a separate trip, or on the return trip to the mule after placing the plug 89, the coating 34 can be sprayed on the sub-conduit 2. Once the coating is sufficiently set, the mouse 13 runs up the sub-conduit 2 to retract and retrieve the plug 89 and replace it in the magazine carried by the mule.

Taping

Figure 22A:
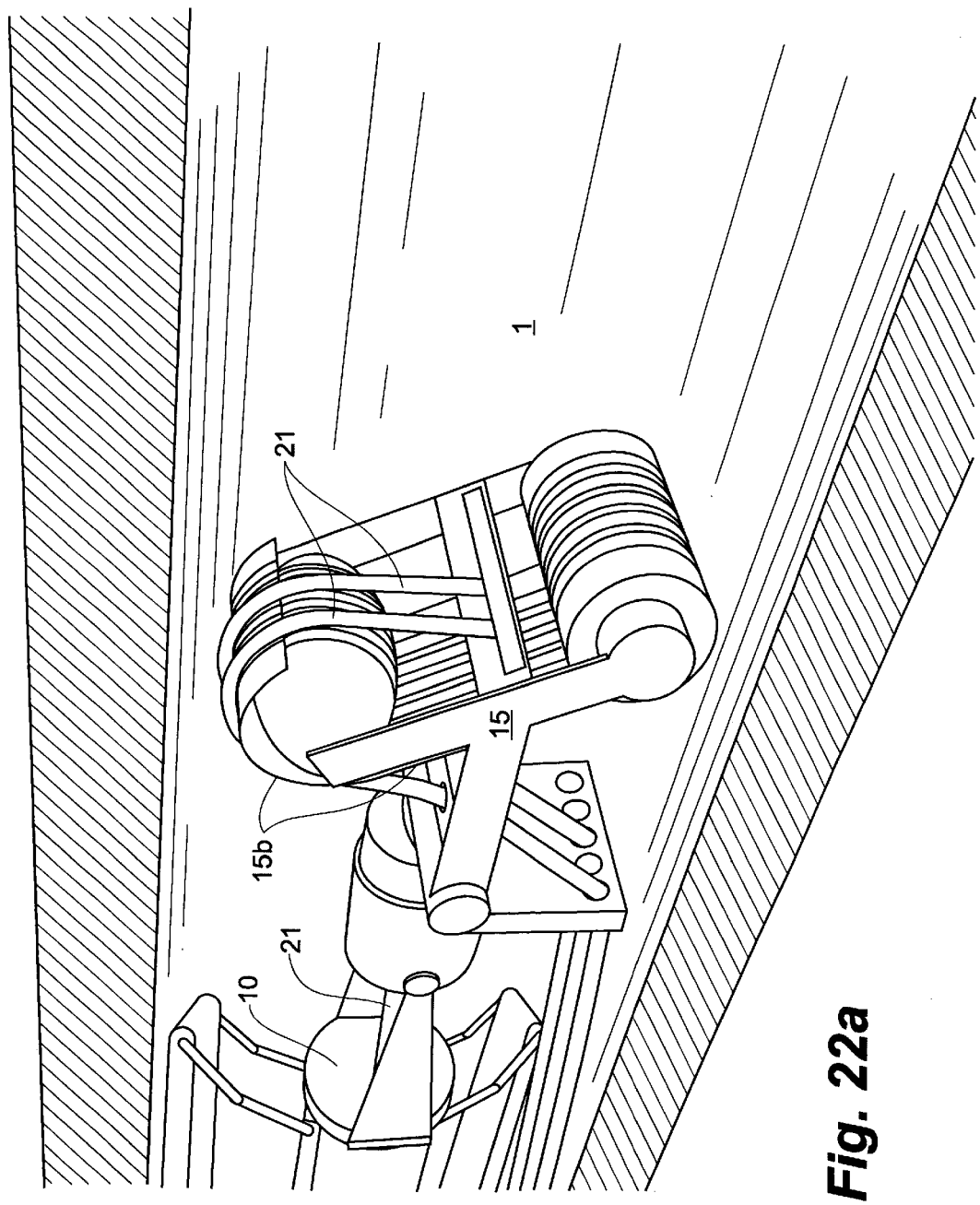
FIGS. 22a–22c illustrate a selected sequence of operations for taping conductors or sheaths in a system of conduits, namely: running in of one or more flexible members, initiation of taping of the members to the conduit; and taping of the flexible members to the conduit.
Figure 22B:
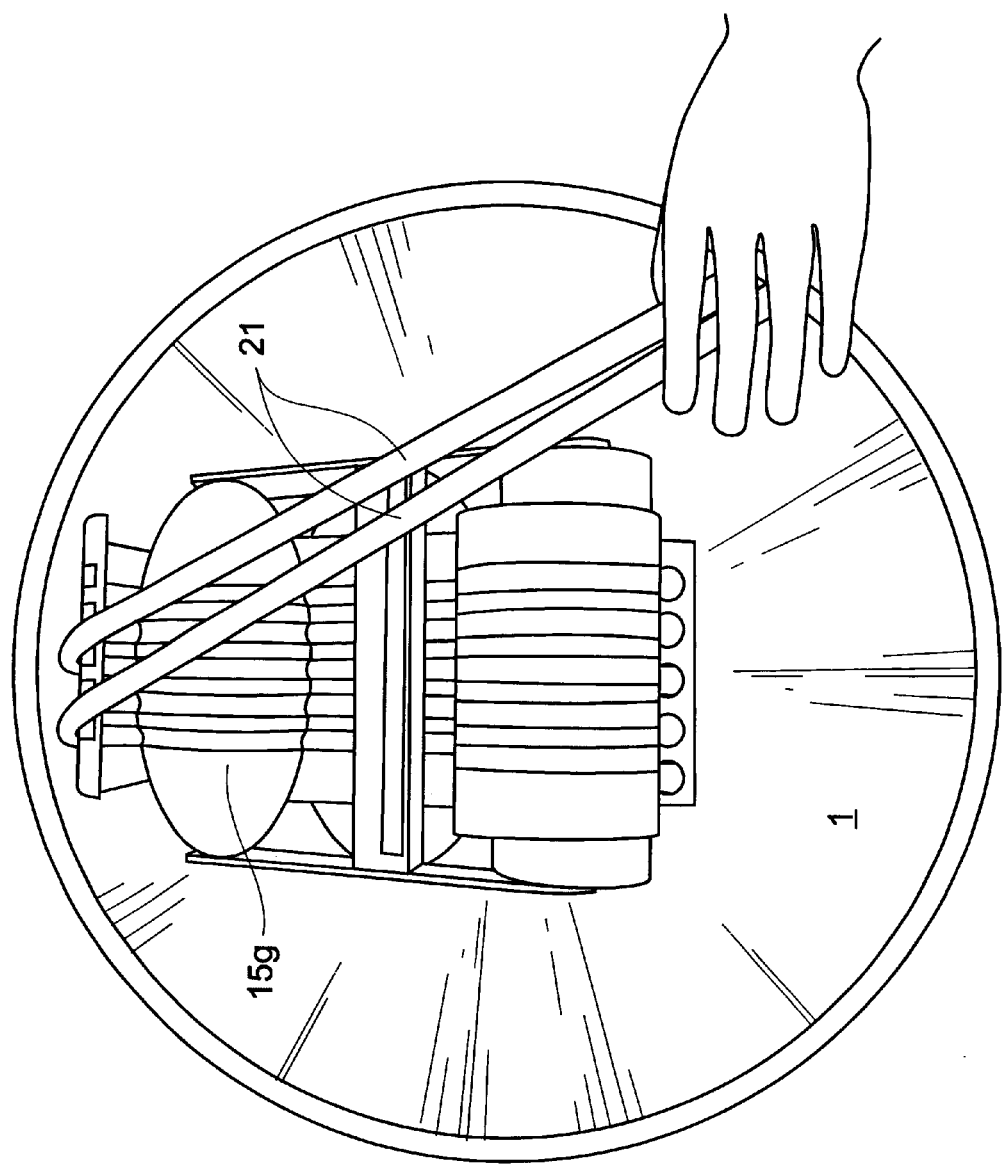
Figure 22C:
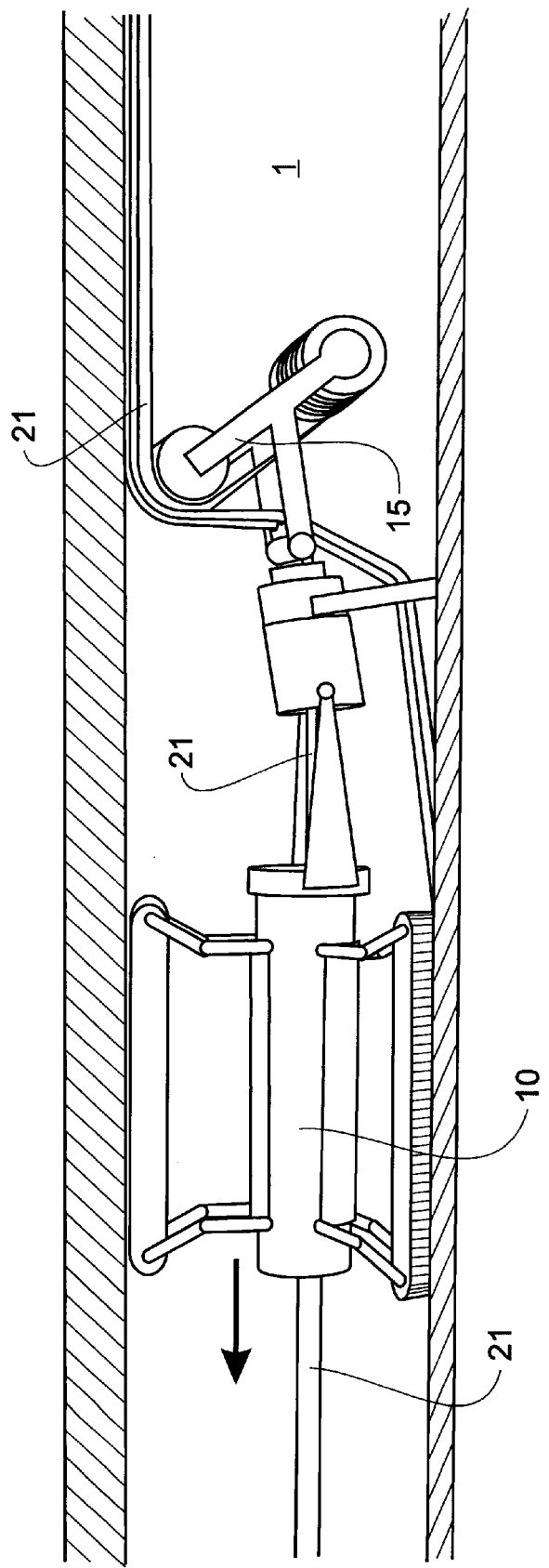

FIGS. 22a–22c illustrate use of the mule 10 to tape several flexible elongated members 21 inside a main conduit 1. While the mouse 13 is illustrated as being transported, it is also inactive, the taping head 15 being operated independently of the mouse 13. The flexible members 21 can be conductors or sheaths for housing conductors in a system of conduits 1,2. As shown in FIG. 22a, the mule runs in one or more flexible members 21 (two shown) and long a conduit 1. As shown in FIG. 22b, at a predetermined termination of the conduit 1, the members 21 are anchored or otherwise secured for initiation prior to taping the members. At FIG. 22c, the mule is retrieved form the conduit 1 while guiding and taping the flexible members 21 to the inside wall (roof) of the conduit 1.

An example of operations in sub-conduits 2 and even those extending into a building are shown in FIGS. 23a–23f. A flexible member 21 is taped in a system of conduits 1,2 using an articulated arm 18 and a plurality of mouse robots 13 according to FIG. 19, namely. In FIG. 23, the mouse 13 is transported by the mule 10 in the transport housing 19a, which in this case is the arm 18. The desired sub-conduit 2 is located. At FIG. 23b, the arm is aligned with the sub-conduit 2. At FIG. 23c, the mouse 13 is run into the sub-conduit, pulling the flexible member 21. At FIG. 23d, the plurality of mouse robots 13 negotiate a curve in the sub-conduit 2. The flexible member 21 is captured and anchored at the termination of the sub-conduit 2. The taping head 15 on the mouse 13 initiates of taping of the member 21 to the conduit 2.

Figure 23D:
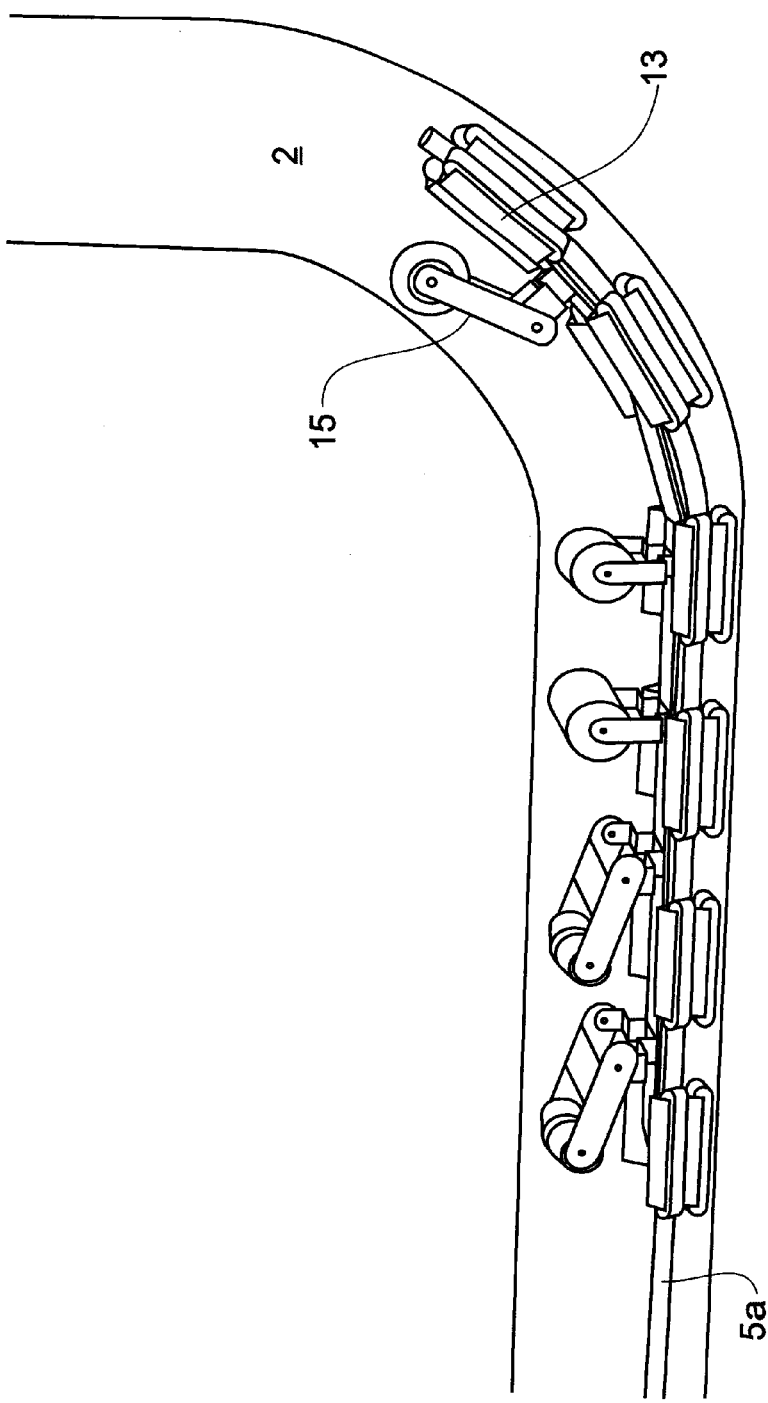
Figure 23E:
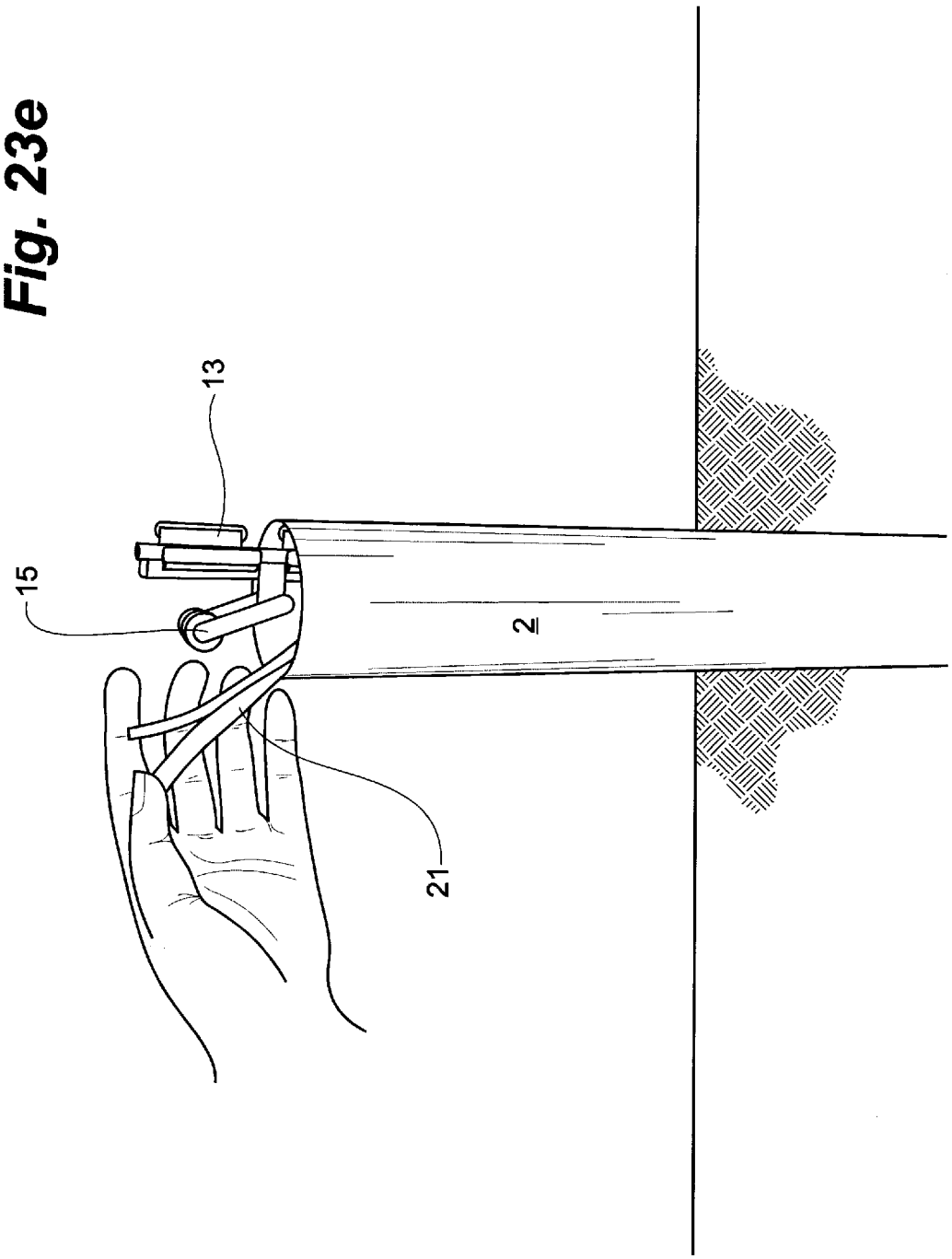
Figure 23F:
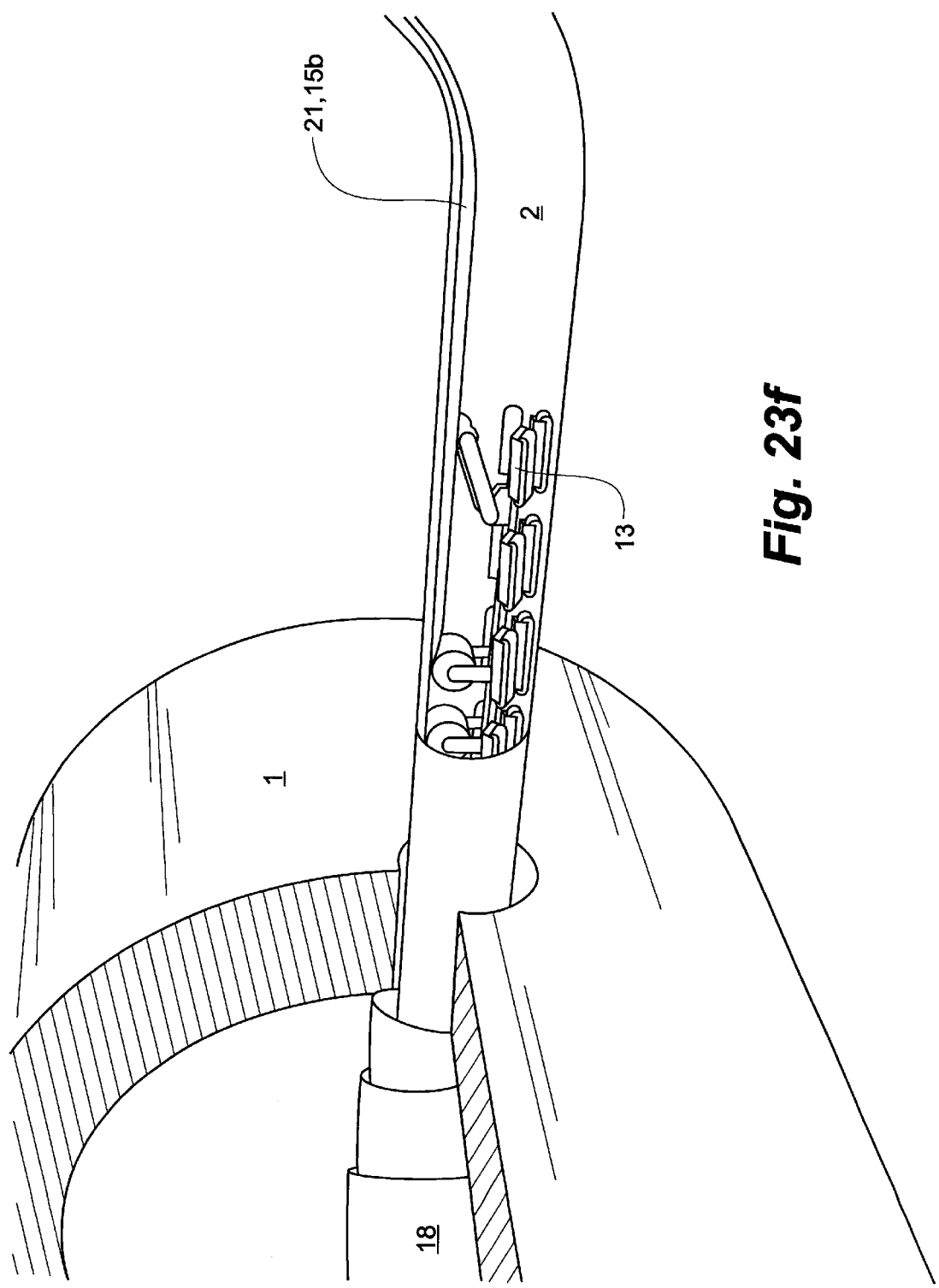
Figure 23G:
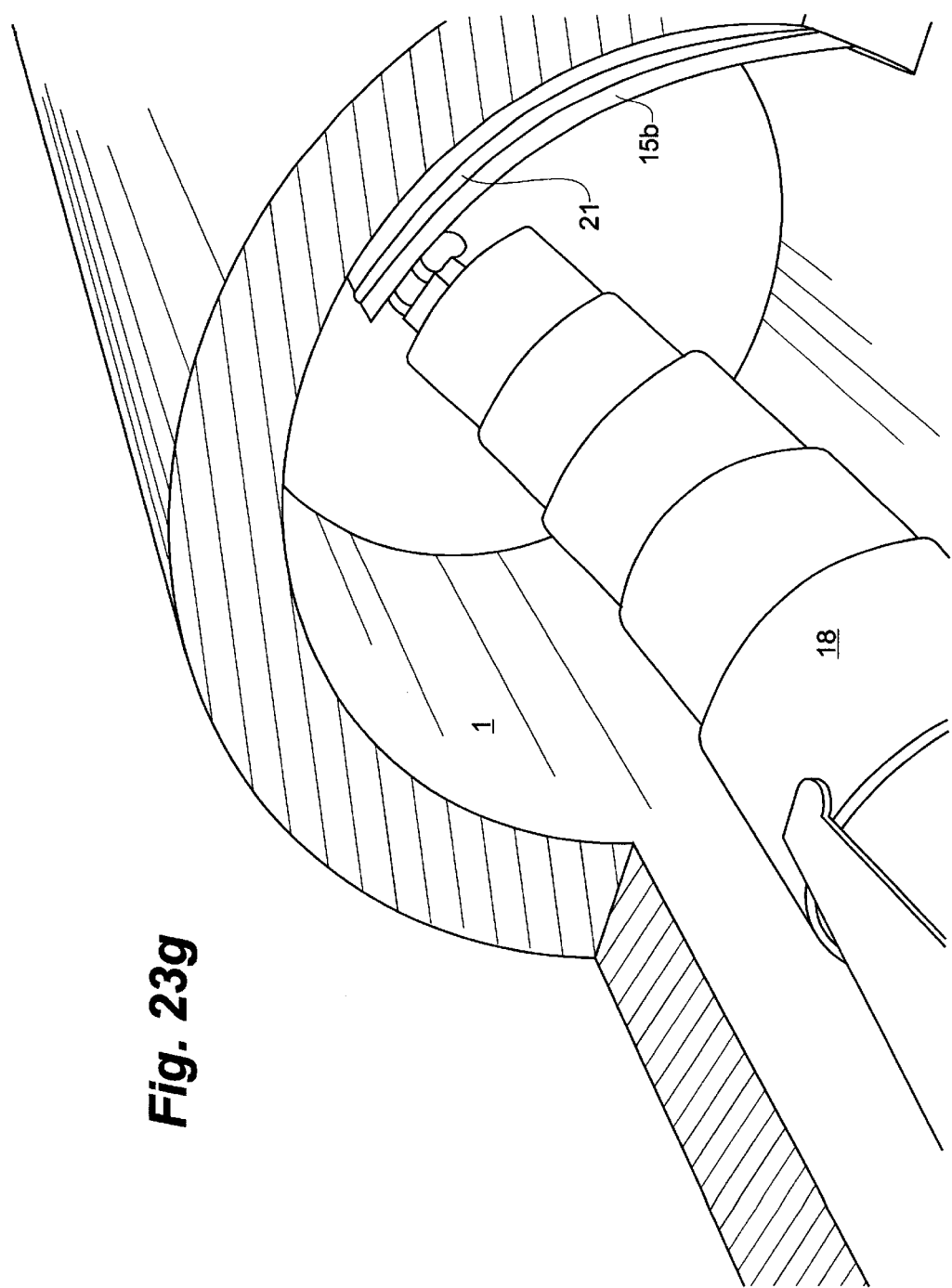

For taping, at FIG. 23f, as the mouse 13 retreats to the mule 10 and the main conduit 1, the mouse 13 guides the flexible member 21 onto the sub-conduit and secures it thereto with the tape 15b. As the mouse exits the sub-conduit 2, the arm 18 can be rotated in coordination with the taping action of the tape head to tape the flexible member 21 on the curved roof of the main conduit 1. As shown in FIG. 23h, as the mule 10 retreats in the main conduit, the mouse's taping head continue to tape of the flexible member 21 to the main conduit 1.

Figure 24:
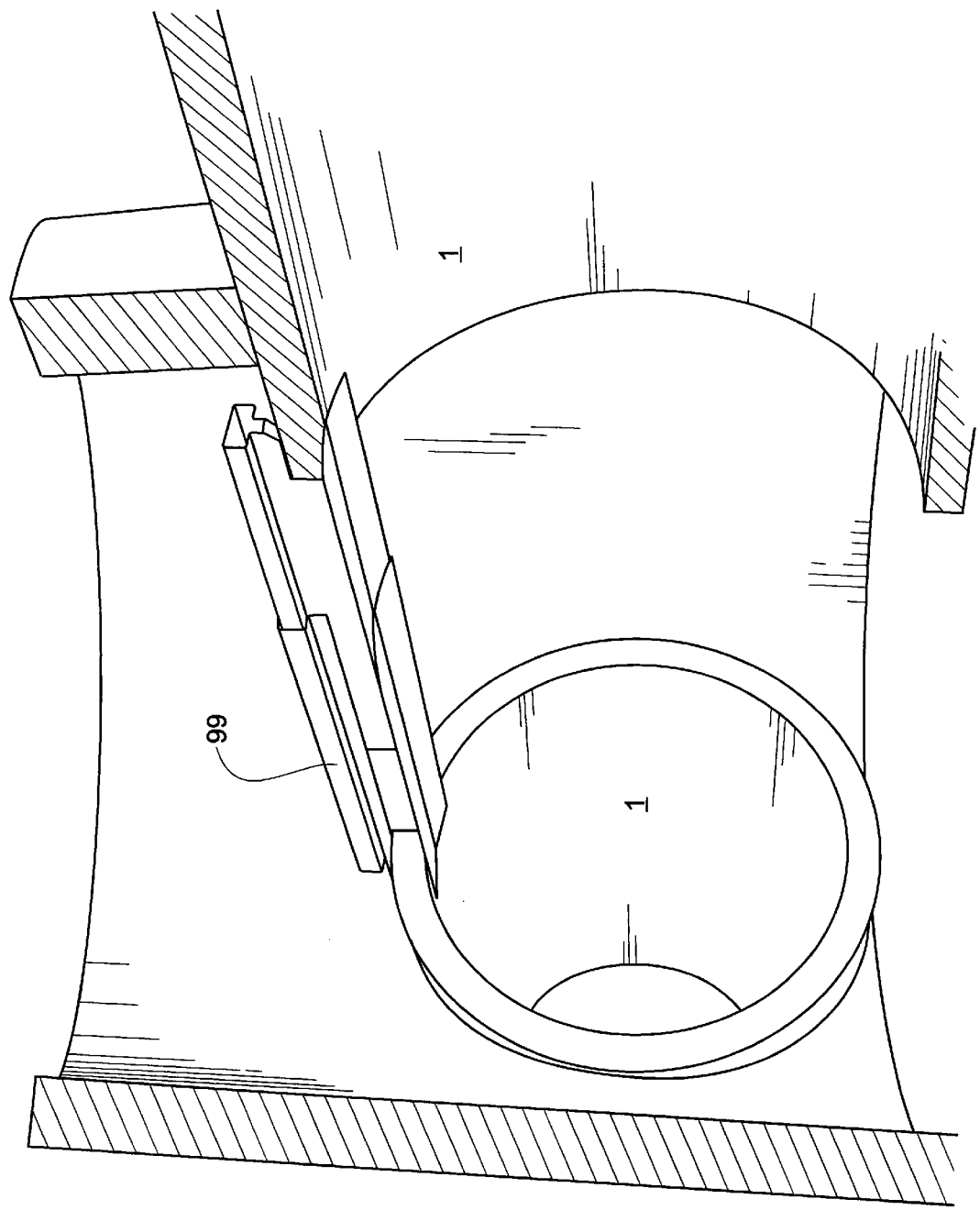
FIG. 24 is a perspective view of a telescoping member configured for bridging an interruption in a conduit so as to provide a contiguous taping path.

As shown in FIG. 24, in situations where a manhole or other access interrupts the main conduit, a telescoping member 99 is extended across the interruption. Accordingly, as shown in FIG. 23h, the flexible member and tape 15b have a continuous and contiguous path.

The embodiments of the invention in which an exclusive property or privilege is being claimed are defined as follows:

1. A method for treating a system of conduits having at least one main conduit and having one or more intersecting sub-conduits comprising:

providing a robotic mouse vehicle suitable for traversing the one or more sub-conduits and conducting treatment;

providing a robotic mule vehicle suitable for traversing the main conduit;

transporting the mouse to the sub-conduit using the mule;

deploying the mouse into the sub-conduit; and treating the conduits and sub-conduits using the mouse and mule;

wherein the mule transports the mouse in a housing capable of aligning with the sub-conduit.

2. The method of claim 1 wherein the intersecting sub-conduits are smaller in diameter than the main conduits.

3. The method of claim 1 wherein the mouse has at least one plug deployment device capable of deploying and releasing expandable plugs into the sub-conduit, further comprising the steps of:

deploying an expandable plug into the sub-conduit so as to block up-stream effluent and thereby preventing the effluent from interfering with the treatment of the conduits and sub-conduits; and recovering the expandable plug after treatment of the sub-conduit.

4. The method of claim 1 wherein the housing is pivotally rotatable to align with the sub-conduit.

5. The method of claim 1 wherein the housing comprises an articulated arm capable of aligning with the sub-conduit.

6. The method of claim 5 further comprising the step of spraying the protective coating from the mouse.

7. The method of claim 1 wherein the conduits and sub-conduits are treated comprising the step of spraying a protective coating to the inside of the conduits and sub-conduits.

8. The method of claim 7 further comprising the step of spraying a plural component polyurethane to the inside of the conduits and sub-conduits.

9. The method of claim 8 further comprising the step of transporting heated plural component polyurethane coating compounds to the mouse through a flexible umbilical.

10. The method of claim 9 where at least a portion of the umbilical contains heating device to heat the plural component polyurethane.

11. The method of claim 10 where the heating device is an electrical wire heating element.

12. The method of claim 10 where the heating device comprises hot oil circulation channels.

13. The method of claim 9 further comprising the step of pulling the umbilical through the main conduit using the mule.

14. The method of claim 13 further comprising the step of pulling the umbilical through the sub-conduits using the mouse.

15. The method of claim 14 further comprising the step of feeding the umbilical from the mule to the mouse so as to assist the mouse in pulling the umbilical through the sub-conduits.

16. The method of claim 8 further comprising purging the spray head with nitrogen when not spraying.

17. The method of claim 1 wherein the system of conduits is treated by installing a flexible elongate member having an end to an inside wall of the conduits further comprising the steps of:

advancing the end of the flexible member through the conduits using the mule and mouse;

anchoring the end of the flexible member; and taping the flexible member to the inside wall of the conduits while withdrawing the mule and mouse.

18. The method of claim 17 where the flexible member is a conductor.

19. The method of claim 18 where the flexible member is a fiber-optic cable.

20. The method of claim 19 wherein the mouse has at least one nozzle for spraying a coating, further comprising the step of spraying coating over the flexible member, tape and at least a portion of the conduit using the spray nozzle while withdrawing the mouse for further securing the tape to the conduit.

21. The method of claim 20 wherein at least a portion of the tape is porous for permitting penetration of the spray coating therethrough for further securing the tape to the conduit.

22. The method of claim 20 wherein the tape has a non-adhesive middle portion for supporting the flexible member and has adhesive edge portions so that the flexible member is substantially unconstrained a by the tape when secured to the conduit.

23. The method of claim 20 wherein at least a portion of the adhesive edge portions of the tape are porous for permitting penetration of the spray coating therethrough for further securing the tape to the conduit.

24. The method of claim 18 where the flexible member is a coaxial cable.

25. The method of claim 17 where the flexible member is a hollow sheath capable of housing a conductor.

26. The method of claim 1, wherein the main conduit is accessible through an intersecting access shaft further comprising the steps of:
placing the mule and mouse in a housing;
lowering the housing down the shaft to align the mule with the main conduit;
securing the housing to the main conduit at the shaft; and
deploying the mule and mouse into the main conduit.

27. The method of claim 26 wherein the housing is telescopically expandable, wherein the housing is secured to the main conduit at the intersecting access shaft further comprising the step of telescopically expanding the housing to bridge the main conduit across the shaft.

28. The method of claim 26 wherein the housing is a clam-shell configuration, capable of increasing and decreasing in lateral dimension, further comprising the steps of:
minimizing the housing's diameter prior to lowering the housing and the mule down the intersecting access shaft; and
increasing the housing's diameter after the housing is secured so as enable deployment of the mule.

29. A method for installing a flexible member to an inside wall of a conduit, comprising the steps of:
providing a robotic vehicle for traversing the conduit;
advancing an end of the flexible member through the conduit using the robotic vehicle being fitted with a tape head;
anchoring the advanced end of the flexible member; and
taping the flexible member to the inside wall using the tape head while withdrawing the robotic vehicle.

30. The method of claim 29 wherein the advanced end of the flexible member is anchored manually by a person having access to the conduit.

31. The method of claim 29, wherein the robotic vehicle has a guiding device suitable for placing and aligning the flexible member against the inside wall, further comprising the step of placing and aligning the flexible member along a designated path using the guiding device, so as to assist in taping the flexible member to the inside wall.

32. The method of claim 31 wherein the conduit is interrupted by at least one intersecting shaft, further comprising the step of:
placing telescoping members across the intersecting shafts; and
aligning the telescoping members with the inside wall of the conduit, so as to provide continuity for the said designated path.

33. The method of claim 29 wherein the robotic vehicle comprises at least two linked robotic vehicles where at least one robotic vehicle is a guiding device and at least one robotic vehicle is a taping device.

34. The method of claim 29 further comprising the steps of spraying a coating over the flexible member and tape after taping the flexible member to the inside wall while withdrawing the robotic vehicle in order to further secure the flexible member and tape.

35. The method of claim 34 wherein the sprayed coating comprises a polyurethane.

36. The method of claim 35 wherein the polyurethane comprises plural components, further comprising the step of:
providing the plural components through an umbilical.

37. The method of claim 36 further comprising the step of:
heating the polyurethane plural components along at least a portion of the umbilical.

38. The method of claim 33 wherein the tape is porous allowing for penetration of the adhesive spray, in order to further secure the flexible member and tape to the inside wall.

39. The method of claim 34 wherein at least a portion of the tape is porous for permitting penetration of the spray coating therethrough for further securing the tape to the conduit.

40. The method of claim 39 wherein the tape has a non-adhesive middle portion for supporting the flexible member and has adhesive edge portions so that the flexible member is substantially unconstrained axially by the tape when secured to the conduit.

41. The method of claim 40 wherein at least a portion of the adhesive edge portions of the tape are porous for permitting penetration of the spray coating therethrough for further securing the tape to the conduit.

42. The method of claim 41 where the flexible member is a conductor.

43. The method of claim 42 where the conductor is a fiber-optic cable.

44. The method of claim 42 where the conductor is a coaxial cable.

45. The method of claim 41 where the flexible member is a hollow sheath capable of housing conductors.

46. An apparatus for treating a system of conduits having at least one main conduit and having one or more intersecting sub-conduits comprising:
a robotic mouse suitable for traversing the one or more sub-conduits;
a device carried by the mouse for treating the one or more conduits;
a robotic mule suitable for traversing the main conduit and for transporting said mouse;
a transport housing supported by the mule and for carrying the mouse; and
means for aligning the transport housing with a sub-conduit.

47. The apparatus of claim 46 wherein the means for aligning the transport housing with a sub-conduit is a tubular housing pivotally mounted to the mule.

48. The apparatus of claim 46 wherein the means for aligning the transport housing with a sub-conduit is an articulated tubular arm supported from the mule.

49. The apparatus of claim 48 wherein the articulated tubular arm comprises:
  a plurality of tubular rings pivotally connected together with alternating horizontal and vertical pivots; and
  means for actuating the arm to articulate at least laterally.

50. The apparatus of claim 46 wherein the treating device is a spray nozzle for dispensing a coating.

51. The apparatus of claim 50 wherein the spray nozzle dispenses polyurethane.

52. The apparatus of claim 50 further comprising an umbilical for supplying the spray nozzle with components for dispensing polyurethane.

53. The apparatus of claim 46 wherein the treating device comprises a tape head mounted to the mouse for taping a flexible elongated member to the inside wall of sub-conduits while withdrawing the mule and mouse therefrom.

54. The apparatus of claim 53 wherein the tape head further comprises:
  a supply of tape having a normally flat cross-section, the tape having at least one working face having a flexible member supporting portion and bounding peripheral edges, the working face having adhesive on at least a portion of its working face;
  at least one pair of rollers for shaping the supporting portion of the cross-section of the flat tape into one or more concave shapes which correspond with the one or more cross-sections of the flexible member;
  one or more tertiary rollers for guiding the flexible member into the concave supporting portion of the tape and pressing the flexible member and tape into engagement with the inner wall of the conduit.

55. The apparatus of claim 54 wherein the supporting portion of the tape is substantially free of adhesive.

56. The apparatus of claim 54 wherein the peripheral edges of the tape are porous, the apparatus further comprising:
  a source of a fluid coating; and
  a nozzle for spraying the coating over the tape once engaged to the inner wall of the conduit, the coating penetrating the porous edges of the tape for adhering to the inner wall of the conduit.

57. The apparatus of claim 56 wherein the spray nozzle dispenses polyurethane.

58. The apparatus of claim 57 further comprising an umbilical for supplying the spray nozzle with components for dispensing polyurethane.

59. The apparatus of claim 58 further comprising a source of heat extending along at least a portion of the umbilical for heating the polyurethane components.

60. An apparatus for installing a flexible elongate member to an inside wall of a conduit, comprising:
  a robotic vehicle for traversing the conduit for advancing an end of the flexible member through the conduit;
  a tape head mounted to the robotic vehicle for taping the flexible member to the inside wall while withdrawing the robotic vehicle;
  a supply of tape having a normally flat cross-section, the tape having at least one working face having a flexible member supporting portion and bounding peripheral edges, the working face having adhesive on at least a portion of its working face;
  at least one pair of rollers for shaping the supporting portion of the cross section of the flat tape into one or more concave shapes which correspond with the one or more cross-sections of the flexible member; and
  one or more tertiary rollers for guiding the flexible member into the concave supporting portion of the tape and pressing the flexible member and tape into engagement with the inner wall of the conduit.

61. The apparatus of claim 60 wherein the supporting portion of the tape is substantially free of adhesive.

62. The apparatus of claim 60 wherein the peripheral edges of the tape are porous, the apparatus further comprising:
  a source of a fluid coating; and
  a nozzle for spraying the coating over the tape once engaged to the inner wall of the conduit, the coating penetrating the porous edges of the tape for adhering to the inner wall of the conduit.

63. The apparatus of claim 60 wherein the taping head is mounted to a robotic mouse which is transported by the robotic vehicle in a transport housing, the housing being rotatable for alignment with sub-conduits extending laterally from the conduit, the robotic mouse being independently mobile of the robotic vehicle.

64. The apparatus of claim 63 wherein the transport housing is pivotally mounted to the robotic vehicle.

65. The apparatus of claim 63 wherein the transport housing is an articulated tubular arm supported from the robotic vehicle.

66. The apparatus of claim 65 wherein the articulated tubular arm comprises:
  a plurality of tubular rings pivotally connected together with alternating horizontal and vertical pivots; and
  means for actuating the arm to curve at least laterally.

* * * * *